US008303521B2

(12) United States Patent
Ikeuchi

(10) Patent No.: US 8,303,521 B2
(45) Date of Patent: Nov. 6, 2012

(54) CONTROL DEVICE FOR WALKING ASSISTANCE DEVICE

(75) Inventor: Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 473 days.

(21) Appl. No.: 12/303,801

(22) PCT Filed: Apr. 11, 2007

(86) PCT No.: PCT/JP2007/058000
§ 371 (c)(1),
(2), (4) Date: Dec. 8, 2008

(87) PCT Pub. No.: WO2007/145018
PCT Pub. Date: Dec. 21, 2007

(65) Prior Publication Data
US 2010/0256538 A1    Oct. 7, 2010

(30) Foreign Application Priority Data
Jun. 12, 2006 (JP) ................. 2006-162050

(51) Int. Cl.
| A61B 5/103 | (2006.01) |
| A61B 5/117 | (2006.01) |
| A61H 1/00 | (2006.01) |
| A61H 1/02 | (2006.01) |
| A61H 5/00 | (2006.01) |
| A61F 2/48 | (2006.01) |
| A61F 2/74 | (2006.01) |
| A61F 2/64 | (2006.01) |
| A61F 2/68 | (2006.01) |

(52) U.S. Cl. ............. 600/595; 600/587; 601/5; 601/35; 623/24; 623/27; 623/40; 623/44

(58) Field of Classification Search ................ 600/587, 600/595; 601/5, 35; 623/24, 27, 40, 44
See application file for complete search history.

(56) References Cited

U.S. PATENT DOCUMENTS
| 3,358,678 A | 12/1967 | Kultsar |
| 6,064,167 A | 5/2000 | Takenaka et al. |
| 7,857,774 B2 * | 12/2010 | Sankai ........................ 601/5 |

(Continued)

FOREIGN PATENT DOCUMENTS
EP    1 053 835    11/2000

(Continued)

*Primary Examiner* — Jeffrey G Hoekstra
*Assistant Examiner* — Devin Henson
(74) *Attorney, Agent, or Firm* — Rankin, Hill & Clark LLP

(57) ABSTRACT

A walking assistance device providing an assistance force to a user is provided. The device compensates for an influence of an inertial force of the device itself. An actuator drives leg joints such that a total sum of supporting forces acting on the leg links from a floor side is a target total lifting force. The total sum of supporting forces acting on leg links from a floor side in reaction to a vertical inertial force generated in the device due to a motion of the device and the gravity acting on the device is estimated as a force which compensates for the self weight of the device. The total sum of a target value of a lifting force to be applied to the user and the estimated value of the force which compensates for the self weight of the device is defined as a target total lifting force.

5 Claims, 15 Drawing Sheets

U.S. PATENT DOCUMENTS

| | | | |
|---|---|---|---|
| 2004/0102723 | A1 | 5/2004 | Horst |
| 2004/0107780 | A1* | 6/2004 | Kawai et al. ............... 73/862.08 |
| 2004/0158175 | A1* | 8/2004 | Ikeuchi et al. .................... 601/5 |

FOREIGN PATENT DOCUMENTS

| | | |
|---|---|---|
| EP | 1 103 451 | 5/2001 |
| EP | 1 422 128 | 5/2004 |
| EP | 1 552 909 | 7/2005 |
| JP | 05-329186 | 12/1993 |
| JP | 06-079657 | 3/1994 |
| JP | 07-112035 | 5/1995 |
| JP | 2002-017795 | 1/2002 |
| JP | 2003-220102 | 8/2003 |
| JP | 2005-237504 | 9/2005 |
| JP | 2006-061460 | 3/2006 |
| WO | 2005/079725 | 9/2005 |

* cited by examiner

CONTROL DEVICE FOR WALKING ASSISTANCE DEVICE

TECHNICAL FIELD

The present invention relates to a control device for a walking assistance device adapted to assist a motion, such as walking, of a user (human being).

BACKGROUND ART

Hitherto, as this type of device, there has been known, for example, the one disclosed in paragraphs 0034 to 0036 and FIG. 15 and FIG. 16 of Japanese Patent Application Laid-Open No. H5-329186 (hereinafter referred to as Patent Document 1). Patent Document 1 describes a device (a walking assistance device) adapted to attach supporting members to the thigh, crus, and foot of each leg of a user and to drive joints, which connect these supporting members, by actuators so as to impart target driving power to the user through the intermediary of the supporting members.

The device described in the aforesaid Patent Document 1 is capable of generating target driving power in a direction in which the user is moving, thereby reducing the driving power required to be generated by the user himself/herself. However, as is obvious from FIG. 15 in Patent Document 1, the weight of the user has to be supported by the user himself/herself, so that a reduction in a load on the user has been unsatisfactory. In addition, the one in Patent Document 1 does not have a technique for compensating for the influences of inertial forces produced due to motions of the user or motions of the supporting members or the actuators, or the gravity acting on the device. Therefore, especially when the user tries to take an agile motion, the user has to bear by himself/herself a force against an inertial force of the device, leading to a possibility of adding to the load on the user rather than reducing the load.

Further, the one disclosed in Patent Document 1 does not have a technique for properly dividing target driving power between the legs of the walking assistance device, so that there has been a possibility that a force not matching a motion of each leg of the user may act on each leg of the user. In addition, according to the one disclosed in Patent Document 1, the supporting members of the walking assistance device are attached to the thigh, the crus, and the foot of each leg of the user, and forces are applied from the supporting members to the thigh, the crus, and the foot of each leg of each leg. This arrangement has been apt to cause the user to feel uncomfortable.

The present invention has been made with a view of the aforesaid background, and it is an object of the invention to provide a control device for a walking assistance device capable of providing a user with an assisting force (lifting force) which makes it possible to properly reduce a force to be supported on a floor by the user himself/herself with his/her leg or legs, while at the same time compensating for, by the walking assistance device, the influence of an inertial force of the device caused by a motion of the user and the influence of gravity acting on the device. It is another object of the invention to provide a control device for a walking assistance device capable of properly distributing an assisting force thereof among leg links associated with the legs of the user.

DISCLOSURE OF INVENTION

To fulfill the aforesaid object, a control device for a walking assistance device according to the present invention is a control device for a walking assistance device equipped with a lifting force transmitting assembly brought in contact with a body trunk of a user to allow an upward lifting force to act on the body trunk, a pair of right and left foot-mounted assemblies which are attached to the feet of the legs of the user and which come in contact with the ground when the legs of the user become standing legs, a pair of right and left leg links, each of which has a plurality of joints and which connects the lifting force transmitting assembly and each of the foot-mounted assemblies, and a right leg link actuator and a left leg link actuator which drive at least one joint of the leg links, the control device comprising:

a target lifting force setting means which sets a target value of the lifting force;

a device self weight compensation force estimating means which estimates the total sum of supporting forces acting on leg links from a floor in reaction to a vertical inertial force actually produced in the walking assistance device due to a motion of the walking assistance device and gravity acting on the walking assistance device as a device self weight compensation force;

a target total lifting force determining means which determines the total sum of a target value of the lifting force and the estimated device self weight compensation force as a target total lifting force of the walking assistance device; and an actuator controlling means which controls driving forces of the right leg link actuator and the left leg link actuator such that the total sum of the supporting forces actually acting from the floor on the leg links of the walking assistance device becomes the target total lifting force (a first invention).

According to the first invention, the total sum of the target value of the lifting force and the estimated device self weight compensation force is defined as the target total lifting force of the walking assistance device. Further, the driving forces of the right leg link actuator and the left leg link actuator are controlled such that the total sum of the supporting forces actually acting from the floor on the leg links of the walking assistance device becomes the target total lifting force.

In this case, the lifting force acting on the body trunk of the user from the lifting force transmitting assembly will be a force obtained by subtracting the total sum of the supporting forces acting on the leg links from the floor in reaction to a vertical inertial force actually generated in the walking assistance device due to a motion of the walking assistance device and the gravity acting on the walking assistance device, i.e., the estimated device self weight compensation force, from a target total lifting force. This means that a target value of the lifting force set by the target lifting force setting means can be directly applied from the lifting force transmitting assembly to the body trunk of the user. Hence, a force to be supported by the user himself/herself with his/her leg or legs on the floor will be reduced by the target value of the lifting force.

Thus, the first invention allows an assisting force (lifting force), which makes it possible to properly reduce a force to be supported on a floor by the user himself/herself with his/her leg or legs, to act on the user, while at the same time compensating for, by the device itself, the influence of an inertial force of the device caused by a motion of the user and the influence of the gravity acting on the device.

As the lifting force transmitting assembly, there is, for example, a seating assembly which is disposed between the roots of the two legs of the user to enable the user to sit thereon.

In the first invention, preferably, the control device includes a treading force measuring means which measures the treading force of each leg of the user on the basis of an output of a first force sensor provided in each of the foot-mounted assemblies and a distributing means which distributes the target total lifting force on the basis of the ratio between the treading force of the left leg of the user and the treading force of the right leg thereof which have been measured, thereby determining a target share, which is a target value of the share of each leg link of the target total lifting force, wherein the actuator controlling means includes a means which controls the driving force of the right leg link actuator such that a supporting force actually acting on the right leg link from the floor becomes the target share associated with the right leg link, and a means which controls the driving force of the left leg link actuator such that a supporting force actually acting on the left leg link from the floor becomes the target share associated with the left leg link (a second invention).

According to the second invention, the target total lifting force is distributed on the basis of the ratio between the treading force of the left leg of the user and the treading force of the right leg thereof, which have been measured, thereby determining the target share of each leg link of the target total lifting force. Then, the driving force of each actuator is controlled such that the supporting force of the target share acts on each leg link from the floor.

Here, the treading force of each leg of the user measured by the treading force measuring means reflects user's intention of how to support his/her own weight and an inertial force by each leg on a floor. For example, if the treading force of the left leg is larger than the treading force of the right leg, it means that the user intends to support his/her own weight or the like mainly by his/her left leg.

Therefore, determining the target share of each leg link of the total target lifting force on the basis of the ratio between the treading force of the left leg of the user and the treading force of the right leg thereof measured as described above allows the target share of each leg link to be determined according to the ratio of the treading forces of the legs of the user. More specifically, the target share of each leg link may be determined such that, for example, the total sum thereof agrees with the total target lifting force and the ratio between the target share of the right leg link and the target share of the left leg link agrees with the ratio between the treading force of the right leg of the user and the treading force of the left leg thereof.

This arrangement allows a target lifting force to be smoothly applied to the user from the lifting force transmitting assembly while distributing the total target lifting force among the leg links to make the leg links bear the shares according to the operation of each leg that the user wishes. As a result, the load on the user can be effectively reduced.

The first force sensor may be provided in each of the foot-mounted assemblies such that, when each leg of the user becomes, for example, a standing leg, the first force sensor is interposed between the foot of the leg and a floor. In this case, the first force sensor of each foot-mounted assembly may be composed of one force sensor or a plurality of force sensors.

In the aforesaid second invention, more specifically, preferably, the control device further includes a control target force measuring means which measures a supporting force actually acting on each leg link from a floor as a control target force on the basis of an output of a second force sensor provided in the leg link, wherein the means which controls the driving force of the right leg link actuator is a means which feedback-controls the right leg link actuator such that the measured control target force of the right leg link approaches to the target share associated with the right leg link, and the means which controls the driving force of the left leg link actuator is a means which feedback-controls the left leg link actuator such that the measured control target force of the left leg link approaches to the target share associated with the left leg link (a third invention).

According to the third invention, for each leg link, the control target force as the supporting force actually acting on the leg link from the floor is measured on the basis of an output of the second force sensor. Then, the driving force of the actuator for the leg link is feedback-controlled so as to bring the measured control target force close to the target share of the leg link. This permits reliable and proper control of the driving force of each actuator to bring the control target force to the target share.

In the first invention to the third invention, each of the leg links described above is composed of, for example, a thigh frame connected to the lifting force transmitting assembly through the intermediary of a first joint, a crus frame connected to the thigh frame through the intermediary of a second joint, and a third joint which connects the foot-mounted assembly to the crus frame. In the leg link having such a structure, the first joint, the second joint, and the third joint correspond to a hip joint, a knee joint, and an ankle joint, respectively, of the user. In this case, according to the second invention or the third invention described above, the device self weight compensation force may be estimated, for example, as described below.

In one example, the control device is equipped with a joint displacement amount measuring means which measures the displacement amount of the second joint of each leg link, and the device self weight compensation force estimating means sequentially estimates the vertical position of the center of gravity of the walking assistance device on the basis of the representative value of a second joint displacement amount, which is the sum of the value obtained by multiplying the proportion of the treading force of the left leg relative to the total sum of the measured treading forces of the right and left legs of the user by the measured displacement amount of the second joint of the left leg link and the value obtained by multiplying the proportion of the treading force of the right leg relative to the total sum of the treading forces by the measured displacement amount of the second joint of the right leg link, and estimates the device self weight compensation force from the time series of the estimated value of the vertical position and a weight and a gravitational acceleration of the walking assistance device (a fourth invention).

In the fourth invention, the representative value of the second joint displacement amount has relatively high correlativity with the vertical position (the position in the direction of height from a floor surface) of the center of gravity of the walking assistance device. Hence, the vertical position of the center of gravity of the walking assistance device can be sequentially estimated on the basis of the representative value of the second joint displacement amount. Once the vertical position of the center of gravity of the walking assistance device is estimated, the device self weight compensation force can be estimated from the time series of the estimated value and the weight and the gravitational acceleration of the walking assistance device. In other words, the vertical motional acceleration of the center of gravity can be identified from the time series of the vertical position of the center of gravity of the walking assistance device. In this case, for example, the value obtained by multiplying the sum of the motional acceleration and the gravitational acceleration by the weight of the walking assistance device corresponds to the estimated value of the device self weight compensation force. The fourth invention allows a device self weight compensation force to be easily estimated by a simple technique.

Alternatively, in another example, the control device is equipped with a joint displacement amount measuring means which measures the displacement amount of the second joint of each leg link and an acceleration sensor which detects the acceleration of the lifting force transmitting assembly, wherein the device self weight compensation force estimating means includes a means which estimates a first component attributable to the weight of a device base assembly of the device self weight compensation force on the basis of an output of the acceleration sensor and a preset weight of the device base assembly composed of the lifting force transmitting assembly and a portion secured to the lifting force transmitting assembly of the walking assistance device, a means which estimates the relative vertical position of the center of gravity of a device right leg relative to the device base assembly, the device right leg being a portion relatively movable integrally with the right leg link of the walking assistance device with respect to the device base assembly on the basis of the measured displacement amount of the second joint of the right leg link, a means which estimates a second component attributable to the weight of a device right leg of the device self weight compensation force on the basis of the time series of the estimated relative vertical position of the center of gravity of the device right leg, a preset weight of the device right leg, and an output of the acceleration sensor, a means which estimates the relative vertical position of the center of gravity of a device left leg relative to the device base assembly, the device left leg being a portion relatively movable integrally with the left leg link of the walking assistance device with respect to the device base assembly on the basis of the measured displacement amount of the second joint of the left leg link, and a means which estimates a third component attributable to the weight of a device left leg of the device self weight compensation force on the basis of the time series of the estimated relative vertical position of the center of gravity of the device left leg, a preset weight of the device left leg, and an output of the acceleration sensor, and estimates the total sum of the estimated first to third components as the device self weight compensation force (a fifth invention).

In the fifth invention, the device self weight compensation force is the total sum of the first component attributable to the weight of the device base assembly (a supporting force against the sum of the gravity acting on the device base assembly and an inertial force generated in the device base assembly), the second component attributable to the weight of the device right leg (a supporting force against the sum of the gravity acting on the device right leg and an inertial force generated in the device right leg), and the third component attributable to the weight of the device left leg (a supporting force against the sum of the gravity acting on the device left leg and an inertial force generated in the device left leg). Incidentally, regarding the device base assembly, the portion secured to the lifting force transmitting assembly means a portion whose relative position with respect to the lifting force transmitting assembly exhibits no change or an extremely small change. The device right leg includes of course the right leg link and also a member which permits relative motions with respect to the lifting force transmitting assembly by the operation of the first joint integrally with the right leg link (e.g., the foot-mounted assembly connected to the right leg link). The device left leg is the same as the device right leg.

In this case, regarding the first component, the acceleration (this including a component of a gravitational acceleration) represented by an output of the acceleration sensor indicates the acceleration of the device base assembly, thus allowing the first component to be estimated on the basis of the output of the acceleration sensor and the weight of the device base assembly. In other words, the result obtained by multiplying acceleration (vertical acceleration) represented by an output of the acceleration sensor by the weight of the device base assembly corresponds to an estimated value of the first component.

Further, regarding the second component, the measured displacement amount of the second joint of the right leg link has high correlativity with the relative vertical position of the device right leg with respect to the device base assembly. Therefore, the relative vertical position of the device right leg can be sequentially estimated on the basis of the displacement amount of the second joint of the right leg link. Then, the second component can be estimated on the basis of the time series of the estimated value of the relative vertical position of the device right leg, the weight of the device right leg, and an output of the acceleration sensor. In other words, the vertical relative motional acceleration of the center of gravity with respect to the device base assembly can be identified from the time series of the relative vertical position of the center of gravity of the device right leg. Thus, for example, the result obtained by multiplying the sum of the relative motional acceleration and the vertical acceleration (=the vertical acceleration of the device base assembly) represented by an output of the acceleration sensor (this means the acceleration of the device right leg) by the weight of the device right leg corresponds to an estimated value of the second component.

Further, regarding the third component, the measured displacement amount of the second joint of the left leg link has high correlativity with the relative vertical position of the device left leg with respect to the device base assembly. Therefore, the relative vertical position of the device left leg can be sequentially estimated on the basis of the displacement amount of the second joint of the left leg link. Then, the third component can be estimated on the basis of the time series of the estimated value of the relative vertical position of the device left leg, the weight of the device left leg, and an output of the acceleration sensor. In other words, the vertical relative motional acceleration of the center of gravity with respect to the device base assembly can be identified from the time series of the relative vertical position of the center of gravity of the device left leg. Thus, for example, the result obtained by multiplying the sum of the relative motional acceleration and the vertical acceleration represented by an output of the acceleration sensor (this means the acceleration of the device left leg) by the weight of the device left leg corresponds to an estimated value of the third component.

Further, adding up the first to the third components estimated as described above allows the device self weight compensation force to be estimated.

According to the fifth invention, using an output of the acceleration sensor in addition to the displacement amount of the second joint of each leg link makes it possible to estimate a device self weight compensation force with higher accuracy. As a result, controlling of a lifting force to a target value can be carried out more properly.

The first joint is preferably a joint which enables each leg link to perform longitudinal swing motions and adducent/abducent motions relative to the lifting force transmitting assembly. The second joint is preferably a joint which enables each leg link to perform bending and stretching motions.

Further, each of the foot-mounted assemblies is preferably provided with a member composed of a flat-plate portion interposed between a foot of the user and a floor surface when each of the legs of the user becomes a standing leg and a highly rigid portion which connects the flat-plate portion to a leg link. As an example, preferably, each of the foot-mounted assemblies is provided with a highly rigid annular member (e.g., a stirrup-like member) into which a foot of the user wearing the foot-mounted assembly is inserted from the tiptoe of the foot, and connected to a leg link through the intermediary of the annular member. Providing the foot-mounted assemblies with such members makes it possible to cause the gravity acting on the walking assistance device or an inertial force generated in the walking assistance device to hardly act on the user, but to act on a floor instead. Incidentally, one side wall portion of the two side wall portions of the annular member may be omitted.

BEST MODE FOR CARRYING OUT THE INVENTION

The following will explain a first embodiment of the present invention with reference to the accompanying drawings.

First, referring to FIG. 1 to FIG. 3, the mechanical structure of a walking assistance device according to the present embodiment will be explained. FIG. 1 is a side view of the walking assistance device 1, FIG. 2 is a fragmentary view taken on line II of FIG. 1, and FIG. 3 is a sectional view taken at the line of FIG. 1. A walking assistance device 1 in these FIG. 1 to FIG. 3 is illustrated in a state wherein it is installed on a user A (indicated by the virtual line) and in operation. In this case, the user A illustrated in the figure is standing in a virtually upright posture. In FIG. 2, however, the user A is in a posture in which his/her legs are laterally spread for the purpose of easy grasping of the structure of the walking assistance device 1.

Referring to FIG. 1 and FIG. 2, the walking assistance device 1 is a weight-free assistance device which supports a part of the weight of the user A (which makes the weight the user supports with himself/herself leg or legs (standing leg or standing legs) lighter than the weight of himself/herself). The walking assistance device 1 is equipped with a seat 2 on which the user A sits and a pair of right and left foot-mounted assemblies 15L, 15R connected to the seat 2 through the intermediary of a pair of right and left leg links 3L, 3R, respectively. The leg links 3L and 3R share the same structure, and the foot-mounted assemblies 15L and 15R share the same structure. In FIG. 1, the leg links 3L and 3R are arranged in the same posture in the lateral direction of the user A (in the direction perpendicular to the paper surface of FIG. 1), and they are overlapped in the drawing (i.e., the left leg link 3L is positioned on the near side in the drawing) in this state. The same applies to the foot-mounted assemblies 15L and 15R in FIG. 1.

Here, in the explanation of the embodiment in the present description, a symbol "R" will be used to mean association with the right leg of the user A or the right leg link 3R of the walking assistance device 1, while a symbol "L" will be used to mean association with the left leg of the user A or the left leg link 3L of the walking assistance device 1. However, if there is no particular need to distinguish between right and left, then the symbols R and L will be frequently omitted.

The seat 2 is saddle-shaped and it allows the user A to sit on the upper surface (the bearing surface) of the seat 2, sitting astride the seat 2 (the seat 2 being positioned between the roots of both legs of the user A). In this sitting state, the seat 2 becomes in contact with the body trunk (the upper body) of the user A at under the crotch of the user A. This makes it possible to impart an upward lifting force to support a part of the weight of the user A to the user A from the seat 2. Hence, the seat 2 corresponds to the lifting force transmitting assembly in the present invention.

Further, a front end portion 2$f$ and a rear end portion 2$r$ of the seat 2 project upward, as illustrated in FIG. 1. This arrangement restricts the sitting position (the longitudinal position) of the user A with respect to the seat 2 to the range between the front end portion 2$f$ and the rear end portion 2$r$ of the seat 2. Incidentally, the front end portion 2$f$ of the seat 2 is bifurcated, as illustrated in FIG. 2.

An acceleration sensor 80 is mounted at a predetermined portion, such as on the bottom surface portion, of the seat 2. The acceleration sensor 80 is, however, used in a second embodiment, which will be described later, and may be omitted in the present embodiment.

Supplementally, in the present embodiment, the lifting force transmitting assembly has been constructed of the seat 2. Alternatively, however, the lifting force transmitting assembly may be constructed of, for example, a member fixedly installed to the outer circumference of the body trunk (the upper body) of the user A or a member attached to the waist of the user A (e.g., a member formed by connecting a plurality of fabric members). The lifting force transmitting assembly may have a different construction as long as it is equipped with a portion which comes in contact with the body trunk of the user A so as to let a force (translational force) act vertically between itself and the body trunk of the user A. In order to reduce the feeling of the user A being constrained and also to make the lifting force efficiently act on the body trunk of the user A, the lifting force transmitting assembly is preferably constructed to have a portion which comes in contact with the crotch or the buttocks of the user A from bottom, so that all or the majority of the lifting force acts on the body trunk of the user A from the portion.

Each of the leg links 3 is equipped with a thigh frame 11 connected to the bottom surface of the seat 2 through the intermediary of a first joint 10, a crus frame 13 connected to the thigh frame 11 through the intermediary of a second joint 12, and a third joint 14 which connects the crus frame 13 to the foot-mounted assembly 15.

The first joint 10 of each of the leg links 3 is a joint which corresponds to a hip joint of the user A and which permits a lateral swing motion about an axis of the leg link 3 (a longitudinal swing-out motion of the leg link 3) and a longitudinal swing motions about the axis thereof (adducent/abducent motions). The first joint 10 is disposed below the seat 2. More specifically, the first joint 10 is provided with a pair of shaft pins 20$f$ and 20$r$ coaxially disposed on a longitudinal axial center C indicated by the chain line in FIG. 1 at a location close to the front of the bottom surface of the seat 2 and at a rear end location, brackets 21$f$ and 21$r$ rotatively supported by the shaft pins 20$f$ and 20$r$, respectively, a circular guide rail 22 secured to the bottom end portions of the brackets 21$f$ and 21$r$, and a plate 23 supported by the guide rail 22 such that the plate 23 is free to move along the guide rail 22. The thigh frame 11 extends from the plate 23 aslant to the front and downward. The thigh frame 11 is an approximately rod-shaped member and integrally formed with the plate 23.

Each of the shaft pins 20$f$ and 20$r$ are secured to the seat 2 through the intermediary of bearings 24$f$ and 24$r$, both end portions (the front and rear end portions) of which are secured to the bottom surface of the seat 2. Further, the upper end portion of the bracket 21$f$ is fitted in the outer periphery of a middle portion of the shaft pin 20$f$ so as to be supported by the shaft pin 20$f$ and free to rotate about the axial center C of the shaft pin 20$f$. Similarly, the bracket 21$r$ is supported by the shaft pin 20$r$ by the upper end portion thereof being fitted in the outer periphery of a middle portion of the shaft pin 20$r$ so as to be free to rotate about the axial center C of the shaft pin 20$r$. Thus, the guide rails 22 of the first joints 10 swing together with the brackets 21*f* and 21*r*, using the axial center C of the shaft pins 20*f* and 20*r* as the rotational center of axis. In the present embodiment, the first joints 10R and 10L of the leg links 3R and 3L share the same rotational axial center C. In other words, the shaft pins 20*f* and 20*r* are shared by the first joint 10R of the leg link 3R and the first joint 10L of the leg link 3L. This means that the bracket 21*f*R of the right first joint 10R and the bracket 21*f*L of the left first joint 10L are supported by the same shaft pin 20*f*. Similarly, the bracket 21*r*R of the right first joint 10R and the bracket 21*r*L of the left first joint 10L are supported by the same shaft pin 20*r*.

The plate 23 of the first joint 10 of each leg link 3 is disposed adjacently to the guide rail 22 in a posture parallel to a plane which includes the circular arc of the guide rail 22. A carrier 26 having a plurality of (e.g., four) rotative rollers 25 is fixed to the plate 23, as illustrated in FIG. 1. Further, the same number of the rollers 25 of the carrier 26 is rotatively engaged with the upper surface (the inner circumferential surface) and the lower surface (the outer circumferential surface), respectively, of the guide rail 22. This allows the plate 23 to move along the guide rail 22. In this case, the positional relationship between the guide rail 22 and the seat 2 and the radius of the circular arc of the guide rail 22 are set such that a central point P of the circular arc of the guide rail 22 lies above the seat 2 when the walking assistance device 1 is observed on the sagittal plane, as illustrated in FIG. 1.

The construction of the first joint 10 explained above allows the thigh frame 11 integral with the plate 23 to swing about the rotative axial center C in the longitudinal direction of the user A, and the swing motion permits the adducent/abducent motions of the leg links 3. The thigh frame 11 integral with the plate 23 is swingable about a lateral axis that passes the central point P (more precisely, about the axis which is perpendicular to the plane including the circular arc of the guide rail 22 and which passes the central point P), and this swing motion permits a longitudinal swing-out motion of each of the leg links 3. In the present embodiment, the first joint 10 is a joint which permits rotary motions about two axes, one in the longitudinal direction and the other in the lateral direction; alternatively, however, the first joint may be constructed such that it also permits a rotary motion about a vertical axis (inner/outer turning motions of the leg links 3) (in other words, such that it permits rotary motions about three axes). Alternatively, the first joint may be a joint which permits rotary motions about only one axis in the lateral direction (a joint which allows each leg link 3 to perform only a longitudinal swing motion).

Further, the plate 23 of the first joint 10 of each leg link 3 extends toward the rear of the seat 2 from the location of the carrier 26 when the walking assistance device 1 is observed on the sagittal plane, as illustrated in FIG. 1. An electric motor 27 and a rotary encoder 28 serving as a rotational angle detecting means for detecting the rotational angle (the rotational angle from a predetermined reference position) of the rotor of the electric motor 27 are coaxially mounted on the rear end portion of the plate 23. In the present embodiment, the second joint 12 among the first to the third joints 10, 12 and 14 of each leg link 3 is driven. The aforesaid electric motor 27 is the actuator which drives the second joint 12. A rotational angle detected by the rotary encoder 28 is used to measure a rotational angle (bending angle) as a displacement amount of the second joint 12.

An electric motor 27L of the left leg link 3L and an electric motor 27R of the right leg link 3R correspond to the actuator for the left leg link and the actuator for the right leg link, respectively, in the present invention. As the actuators, hydraulic or pneumatic actuators may be used. Each of the actuators may be secured, for example, to a rear portion of the seat 2 through the intermediary of an appropriate bracket or to the thigh frame 11 of each leg link 3. Alternatively, each actuator may be mounted on the second joint 12 of each leg link 3 to directly drive the second joint 12. The sensor for detecting the displacement amount of the second joint 12 (a joint displacement amount sensor) may be directly mounted on the second joint 12 of each leg link 3. Further, the joint displacement amount sensor may be composed of a potentiometer or the like in place of the rotary encoder.

The second joint 12 of each leg link 3 is a joint corresponding to a knee joint of the user A and it is a joint which permits stretching/bending motions of the leg link 3. The second joint 12 connects the lower end portion of the thigh frame 11 and the upper end portion of the crus frame 13 through the intermediary of a shaft pin 29 having a lateral axial center (more precisely, the axial center in the direction perpendicular to the plane which includes the circular arc of the guide rail 22). The second joint 12 allows the crus frame 13 to relatively rotate about the axial center of the shaft pin 29 with respect to the thigh frame 11. The second joint 12 is provided with a stopper, not shown, which restricts the rotative range of the crus frame 13 relative to the thigh frame 11.

The crus frame 13 of each leg link 3 is shaped approximately like a rod which extends aslant downward from the second joint 12 of the leg link 3. More specifically, the crus frame 13 is formed by connecting a lower crus frame 13*b* constituting a portion adjacent to the third joint 14 and a rod-shaped upper crus frame 13*a* constituting a portion above the lower crus frame 13*b* with a force sensor 30 (this corresponding to the second force sensor in the present invention) interposed therebetween. The lower crus frame 13*b* is sufficiently shorter than the upper crus frame 13*a*. Hence, the force sensor 30 is installed on the crus frame 13 of each of the leg links 3 at a position adjacent to the foot-mounted assembly 15. The force sensor 30 is a three-axis force sensor which detects translational forces on three axes (a translational force in the axial direction perpendicular to the surface of the force sensor 30 and translational forces in two axial directions which are parallel to the surface and which are orthogonal to each other). In the present embodiment, however, only the detection values of translational forces on two axes among detected translational forces on three axes will be used, as will be discussed later. Hence, the force sensor 30 may be composed of a two-axis force sensor which detects translational forces on two axes.

Further, a pulley 31 rotative integrally with the crus frame 13 around the shaft pin 29 of the second joint 12 is secured to the upper end portion of the upper crus frame 13*a* of the crus frame 13. The ends of a pair of wires 32*a* and 32*b* as the drive force transmitting means for transmitting the rotational drive force of the electric motor 27 to the pulley 31 are secured to the outer circumference of the pulley 31. These wires 32*a* and 32*b* are respectively drawn out in the tangential direction of the pulley 31 from two locations opposing the diametrical direction of the outer circumference of the pulley 31. Further, the wires 32*a* and 32*b* are passed through a rubber tube (wire protective tube), not shown, laid along the thigh frame 11 and connected to a rotational drive shaft (not shown) of the electric motor 27. In this case, tensions are imparted from the electric motor 27 to the wires 32*a* and 32*b* such that forward rotation of the rotational drive shaft of the electric motor 27 causes one of the wires 32*a* and 32*b* to be wound up onto the pulley 31 while the other to be pulled out from the pulley 31, and reverse rotation of the rotational drive shaft of the electric motor 27 causes the other of the wires 32*a* and 32*b* to be wound up onto the pulley 31 while the one to be pulled out from the pulley 31. Thus, the rotational drive force of the electric motor 27 is transmitted to the pulley 31 via the wires 32a and 32b, rotatively driving the pulley 31 (the crus frame 13 with the pulley 31 secured thereto rotates about the axial center of the shaft pin 29 of the second joint 12 with respect to the thigh frame 11).

The lower end portion of the lower crus frame 13b of the crus frame 13 is provided with a bifurcated portion 13bb, which is formed to be bifurcated, as illustrated in FIG. 3.

The third joint 14 of each leg link 3 is a joint corresponding to an ankle joint of the user A. In the present embodiment, the third joint 14 is composed of a free joint 33 (refer to FIG. 3), which permits rotation about three axes, as illustrated in FIG. 3. The free joint 33 is installed to the bifurcated portion 13bb of the lower crus frame 13b of the crus frame 13 to connect the lower end portion (the bifurcated portion 13bb) of the crus frame 13 and the upper joining portion 34 of the foot-mounted assembly 15. This arrangement allows the foot-mounted assembly 15 to rotate with 3 degrees of freedom in relation to the crus frame 13.

Each of the foot-mounted assemblies 15 is provided with a shoe 35 in which the user A places his/her foot and a stirrup-shaped annular member 36 which is accommodated in the shoe 35 and the upper end portion of which is secured to the joining portion 34. The annular member 36 is formed of a highly rigid metal or the like. Further, the annular member 36 is accommodated in the shoe 35 such that the flat bottom plate thereof is abutted against the internal bottom surface of the shoe 35 and the curved portions (side wall portions) connected to both ends of the bottom plate extend along the side walls of the shoe 35, as illustrated in FIG. 3. Further, an insole member 37 (not shown in FIG. 1) is inserted inside the shoe 35 such that it covers the internal bottom surface of the shoe 35 and the bottom plate of the annular member 36. Incidentally, the joining portion 34 is inserted inside the shoe 35 through an opening of a shoelace attaching portion of the shoe 35.

To attach the foot-mounted assembly 15 of each of the leg links 3 to each foot of the user A, the toe portion of the foot is passed through the annular member 36 and the foot of the user A is inserted into the shoe 35 from the wearing opening of the shoe 35 such that the bottom surface of the foot comes in contact with the insole member 37. Further, tightening a shoelace attaches the foot-mounted assembly 15 to the foot.

Further, the bottom surface of the insole member 37 of the foot-mounted assembly 15 is provided with force sensors 38 and 39 installed at a front location of the shoe 35 (a location closer to the front side than the bottom plate of the annular member 36) and a rear location (a location closer to the rear side than the bottom plate of the annular member 36). Thus, the force sensors 38 and 39 are interposed between the bottom surface of a foot of the user A and the bottom portion of the shoe 35, which is a ground contacting portion of the foot-mounted assembly 15. The force sensor 38 on the front side is disposed substantially right below an MP joint (metatarsophalangeal joint) of the foot of the user A wearing the foot-mounted assembly 15. Further, the force sensor 39 on the rear side is disposed substantially right below the heel of the foot. These force sensors 38 and 39 in the present embodiment are one-axis force sensors for detecting translational forces in the direction perpendicular (direction substantially perpendicular to a floor surface in a state wherein the legs of the user A become standing legs) to the bottom surfaces (the ground contacting surfaces) of the foot-mounted assemblies 15. Hereinafter, the force sensors 38 and 39 will be referred to as the MP sensor 38 and the heel sensor 39, respectively.

Incidentally, the MP sensor 38 and the heel sensor 39 together constitute the first force sensor in the present invention.

Supplementally, the insole member 37 may be composed of a soft (flexible) material or it may be composed of a highly rigid material. If the insole member 37 is formed of a soft material, then a force applied to each portion of the bottom surface of the foot of the user A can be accurately detected by providing the bottom surface thereof with a plurality of force sensors. Meanwhile, if the insole member 37 is formed of a highly rigid member, then a treading force produced by the entire foot of the user A can be easily detected, making it possible to reduce the number of force sensors installed on the bottom surface of the insole 37.

Further, each of the foot-mounted assemblies 15 may be provided with a construction described below to detect the treading force of each leg of the user A. For example, a flat-plate foot supporting member capable of supporting a foot of the user A from the bottom surface thereof (e.g., a member having the same shape as that of the insole member 37) is disposed inside the annular member 36. Further, an arm member extending toward the upper side of the instep of the foot from both sides of the foot supporting member is suspended from the upper end portion of the inner surface of the annular member 36 through the intermediary of a force sensor. In this case, the foot supporting member and the arm member are disposed such that they do not come in contact with the inner surface of the annular member 36 or the shoe 35. This arrangement causes a force which is substantially equivalent to a treading force to act on the force sensor, so that the treading force can be measured on the basis of an output of the force sensor.

The above has described the mechanical structure of the walking assistance device 1 of the present embodiment. Supplementally, when the user A who has an average build stands in an upright posture, the second joint 12 of each of the leg links 3 juts out to the front farther than the leg of the user A, as illustrated in FIG. 1. In other words, the length of the thigh frame 11 and the length of the crus frame 13 are set such that the sum of these lengths is slightly larger than the inseam dimension of the leg of the user A having the average build. The lengths of the thigh frame 11 and the crus frame 13, which are set as described above, combined with the stopper provided on the second joint 12 prevent a singular point state in which the thigh frame 11 and the crus frame 13 are inconveniently aligned or a state in which the thigh frame 11 and the crus frame 13 bend in the opposite direction from that illustrated in FIG. 1. As a result, a situation which undesirably disables the control of the operation of the walking assistance device 1 due to the singular point state or the reverse bending state of the leg links 3 will be prevented.

Incidentally, the second joint of each of the leg links 3 may be a direct-acting type joint.

Although it will be described in detail later, in the walking assistance device 1 constructed as described above, an upward lifting force is applied to the user A from the seat 2 by generating a torque of each of the second joints 12 by each of the electric motors 27, with the foot-mounted assembly 15 attached to the foot of each leg of the user A. At this time, a floor reaction force acts on the surfaces of the foot-mounted assemblies 15, 15 which are in contact with a floor. The resultant force of the floor reaction forces acting on the ground contact surfaces of the foot-mounted assemblies 15 is a force which balances the sum of the gravity acting on the user A, the gravity acting on the walking assistance device 1, and an inertial force produced by motions of the user A and the walking assistance device 1, that is, a reaction force acting from the floor in reaction to the gravity and the inertial force.

Incidentally, the gravity acting on the user A means a gravity corresponding to the total weight of the user A, including the garment (things on the entire body) and belongings of the user A (the product of the total weight and a gravitational acceleration constant). Further, the gravity acting on the walking assistance device 1 means the gravity corresponding to the total weight of the walking assistance device 1, including a controller, which will be discussed later (the product of the total weight and the gravitational acceleration constant).

The reaction force acting from the floor side to the walking assistance device 1 or the user A in reaction to the gravity and the inertial force, as described above, is referred to as the supporting force in the present description. The resultant force of floor reaction forces acting on the ground contact surfaces of the foot-mounted assemblies 15 will be hereinafter referred to as the total supporting force. Incidentally, a "force" is generally composed of a translational force component and a moment component, while a "force" in the present description means a translational force.

Supplementally, the aforesaid inertial force is sufficiently small in a state wherein the user A is substantially stationary or a motion of the user A is being performed slowly. In this case, the total supporting force substantially agrees with a force (a vertical translational force) which balances the sum of the gravity acting on the user A and the gravity acting on the walking assistance device 1.

Here, in the walking assistance device 1 according to the present embodiment, only both foot-mounted assemblies 15 and 15 are constrained by being attached to the user A. Each of the foot-mounted assemblies 15 is provided with the annular member 36. Therefore, the gravity acting on the walking assistance device 1, a load received by the walking assistance device 1 from the user A through the intermediary of the seat 2 (a downward translational force), and an inertial force generated at the walking assistance device 1 (more specifically, a vertical inertial force) hardly act on the user A, but act on the floor surface from the two leg links 3 and 3 via the annular members 36 and 36 of the two foot-mounted assemblies 15 and 15.

Accordingly, of the aforesaid total supporting force, a supporting force against the sum of the gravity acting on the walking assistance device 1, the load that the walking assistance device 1 receives from the user A through the intermediary of the seat 2, and the vertical inertial force generated in the walking assistance device 1 acts on the walking assistance device 1 from the floor. This supporting force means the supporting force borne by the walking assistance device 1 out of the aforesaid total supporting force. The supporting force borne by the walking assistance device 1 as described above will be hereinafter referred to as "the borne-by-the-device supporting force."

If both legs of the user A are standing legs (if both foot-mounted assemblies 15 and 15 of the walking assistance device 1 are in contact with the ground), then the borne-by-the-device supporting force is borne by being shared between the set of the left leg link 3L and the foot-mounted assembly 15L and the set of the right leg link 3R and the foot-mounted assembly 15R. In other words, a part of the supporting force of the borne-by-the-device supporting force is carried by one leg link 3 and the rest of the supporting force is carried by the other leg link 3. If only one leg of the user A is a standing leg (if the other leg is a free leg), then all the borne-by-the-device supporting force is carried by the set of the standing leg link 3 and the foot-mounted assembly 15 of the standing leg. Hereinafter, the supporting force borne by each set of the leg link 3 and the foot-mounted assembly 15 out of the borne-by-the-device supporting force will be referred to as the leg link supporting force. Further, the supporting force borne by the set of the leg link 3R and the foot-mounted assembly 15R on the right side will be referred to as the right leg link supporting force, and the supporting force borne by the set of the leg link 3L and the foot-mounted assembly 15L on the left side will be referred to as the left leg link supporting force. The total sum of the left leg link supporting force and the right leg link supporting force agrees with the borne-by-the-device supporting force.

Of the borne-by-the-device supporting force, the supporting force against the sum of the gravity acting on the walking assistance device 1 and the vertical inertial force generated in the walking assistance device 1, i.e., the supporting force obtained by subtracting the lifting force acting on the user A from the seat 2 from the borne-by-the-device supporting force, corresponds to the device self weight compensation force in the present invention. The device self weight compensation force means the supporting force acting on the walking assistance device 1 due to the weight of the walking assistance device 1 itself.

Meanwhile, the supporting force obtained by subtracting the borne-by-the-device supporting force from the total supporting force acts on both legs of the user A from a floor surface, and this supporting force will be borne by the legs of the user A. Hereinafter, the supporting force borne by the user A will be referred to as the borne-by-the-user supporting force. If both legs of the user A are standing legs, then the borne-by-the-user supporting force will be borne by and shared between both legs of the user A. In other words, a partial supporting force of the borne-by-the-user supporting force is carried by one leg, and the remaining supporting force is carried by the other leg. If only one leg of the user A is a standing leg, then all the borne-by-the-user supporting force will be borne by the one leg. Hereinafter, of the borne-by-the-user supporting force, the supporting force borne by each leg (the supporting force acting on each leg from a floor) will be referred to as the user leg supporting force. Further, the supporting force carried by the right leg will be referred to as the user right leg supporting force, and the supporting force carried by the left leg will be referred to as the user left leg supporting force. The total sum of the user left leg supporting force and the user right leg supporting force agrees with the borne-by-the-user supporting force.

The force used by the user A to push the foot of each leg against the floor surface to support himself/herself will be referred to as the treading force of the leg. The treading force of each leg is a force balancing the aforesaid user leg supporting force.

Supplementally, in a state wherein the foot-mounted assembly 15 connected to each leg link 3 is in contact with the ground, the force sensor 30 provided on the leg link 3 is subjected to a supporting force obtained by subtracting the supporting force against the gravity acting on a portion of the leg link 3 below the force sensor 30 (mainly the foot-mounted assembly 15) from a leg link supporting force associated with the leg link 3. Then, the components in the directions of three axes (or the components in the directions of two axes) of the acting supporting force are detected by the force sensor 30. However, the weight of the portion below the force sensor 30 provided in each of the leg links 3 (mainly the foot-mounted assembly 15) is sufficiently smaller than the weight of the entire walking assistance device 1. Thus, the force acting on the force sensor 30 is substantially equal to the aforesaid leg link supporting force. Therefore, the force sensor 30 of each of the leg links 3 virtually detects a leg link supporting force associated with the leg link 3. In the following explanation, the force sensor 30 will be referred to as the supporting force sensor 30. Further, of the supporting forces acting on the supporting force sensors 30, the total sum of the supporting forces on the two leg links 3 and 3 will be referred to as the total lifting force (≈borne-by-the-device supporting force). Further, of the total lifting force, the share borne by each of the leg links 3 will be referred to as the total borne lifting force share (≈leg link supporting force).

Further, the total sum of the forces acting on an MP sensor 38L and a heel sensor 39L of the left foot-mounted assembly 15L corresponds to the user left leg supporting force (or a left leg treading force), and the total sum of the forces acting on an MP sensor 38R and a heel sensor 39R of the right foot-mounted assembly 15R corresponds to the user right leg supporting force (or a right leg treading force). In the present embodiment, one-axis force sensors have been used for the MP sensors 38 and the heel sensors 39; however, for example, two-axis force sensors adapted to also detect translational forces in the direction substantially parallel to the bottom surfaces of the shoes 33, or three-axis force sensors may be alternatively used. The MP sensors 38 and the heel sensors 39 are preferably sensors capable of detecting translational forces which are substantially perpendicular to at least the bottom surfaces of the shoes 33 or a floor surface.

In the present embodiment, the annular members 36 have been used in order to cause the gravity acting on the walking assistance device 1, the load (the downward translational force) that the walking assistance device 1 receives from the user A through the intermediary of the seat 2, and the inertial force (more specifically, the vertical inertial force) generated at the walking assistance device 1 to hardly act on the user A, but to act on the floor surface. However, for example, a member which omits one of the two side portions (the curved portions) of the annular member 36 may be alternatively used.

A controller which controls the operation of the walking assistance device 1 (the operations of the electric motors 27R and 27L) constructed as described above will now be explained.

FIG. 4 is a block diagram schematically illustrating the construction (hardware construction) of a controller 50. As illustrated in the figure, the controller 50 is provided with an arithmetic processing unit 51 comprised of a microcomputer (a CPU, a RAM and a ROM) and input/output circuits (an A/D converter, etc.), driver circuits 52R and 52L of the electric motors 27R and 27L, respectively, a lifting force setting key switch 53 for setting the target value of the magnitude of the lifting force for the user A imparted by the walking assistance device 1 (an upward translational force acting on the user A from the seat 2), a lifting force control ON/OFF switch 54 for selecting whether to generate a lifting force for the user A, a power battery 55, and a power supply circuit 57 which is connected to the power battery 55 via a power switch 56 (ON/OFF switch) and which supplies electric power from the power battery 55 to circuits 51, 52R and 52L of the controller 50 when the power switch 56 is turned ON (closed).

The controller 50 is secured to the rear end portion of the seat 2 or the plate 23R, 23L or the like through the intermediary of a bracket (not shown). Further, the lifting force setting key switch 53, the lifting control ON/OFF switch 54, and the power switch 56 are accessibly attached to the outer surface of a cabinet (not shown) of the controller 50. The lifting force setting key switch 53 is composed of a ten-key switch or a plurality of selector switches or the like to permit direct setting a desired target value of a lifting force or to permit selective setting from among a plurality of types of target values prepared in advance.

The MP sensors 38R, 38L, the heel sensors 39R, 39L, supporting force sensors 30R, 30L, and rotary encoders 28R, 28L are connected to the controller 50 through connecting lines, which are not illustrated. Output signals of these sensors are input to the arithmetic processing unit 51. Further, the arithmetic processing unit 51 also receives operation signals of the lifting force setting key switch 53 and the lifting control ON/OFF switch 54 (signals indicating the operational states of the switches). Further, the electric motors 27R and 27L are connected to the controller 50 through connecting lines, not shown, to supply current to the electric motors 27R and 27L from the driver circuits 52R and 52L, respectively. And, the arithmetic processing unit 51 determines the command values of the energizing currents for the electric motors 27R and 27L (hereinafter referred to as indicated current values) by arithmetic processing (control processing), which will be described later. Then, the arithmetic processing unit 51 controls the driver circuits 52R and 52L on the basis of the indicated current values thereby to control the generated torques (driving forces) of the electric motors 27R and 27L.

Incidentally, output signals (voltage signals) of the MP sensors 38R, 38L, the heel sensors 39R, 39L, and the supporting force sensors 30R, 30L may be amplified by a preamplifier in the vicinity of the sensors and then input to the controller 50. Further, the output signals of the MP sensors 38R, 38L, the heel sensors 39R, 39L, and the supporting force sensors 30R, 30L are amplified and then the voltage values thereof are subjected to A/D conversion before being captured into the arithmetic processing unit 51.

The arithmetic processing unit 51 is provided with the functional means as illustrated in the block diagram of FIG. 5, as the main functional means thereof. The functional means provide the functions implemented by programs stored in the ROM.

Referring to FIG. 5, the arithmetic processing unit 51 is equipped with a right treading force measurement processing means 60R to which the output signals of the MP sensor 38R and the heel sensor 39R of the right leg link 3R, and a left treading force measurement processing means 60L to which the output signals of the MP sensor 38L and the heel sensor 39L of the left leg link 3L. The right treading force measurement processing means 60R is a means which carries out the processing for measuring the magnitude of the treading force of the right leg of the user A (the magnitude of the user right leg supporting force) from the voltage values of the output signals of the MP sensor 38R and the heel sensor 39R. Similarly, the left treading force measurement processing means 60L is a means which carries out the processing for measuring the magnitude of the treading force of the left leg of the user A (the magnitude of the user left leg supporting force) from the voltage values of the output signals of the MP sensor 38L and the heel sensor 39L. Incidentally, these treading force measurement processing means 60R and 60L correspond to the treading force measuring means in the present invention.

Further, the arithmetic processing unit 51 is equipped with a right knee angle measurement processing means 61R and a left knee angle measurement processing means 61L to which the output signals (pulse signals) of the rotary encoders 28R and 28L are input. These knee angle measurement processing means 61R and 61L are means which measure, from the input signals, the bending angles at the second joints 12 (the displacement amounts of the second joints 12) of the leg links 3 associated with the respective input signals. The second joint 12 of each of the leg links 3 corresponds to the knee joint of the leg link 3, so that the bending angle at the second joint 12 will be hereinafter referred to as the knee angle. These knee angle measurement processing means 61R and 61L correspond to the joint displacement amount measuring means in the present invention.

Further, the arithmetic processing unit 51 is equipped with a right supporting force measurement processing means 62R which receives an output signal of the supporting force sensor 30R of the right leg link 3R and the knee angle of the right leg link 3R measured by the right knee angle measurement processing means 61R and a left supporting force measurement processing means 62L which receives an output signal of the supporting force sensor 30L of the left leg link 3L and the knee angle of the left leg link 3L measured by the left knee angle measurement processing means 61L. The right supporting force measurement processing means 62R is a means which carries out the processing for measuring the supporting force acting on the supporting force sensor 30R out of the right leg link supporting force, i.e., the total lifting force share of the right leg link 3R on the basis of an output signal of the supporting force sensor 30R and the measurement value of the knee angle of the right leg link 3R, which have been input. Similarly, the left supporting force measurement processing means 62L is a means which carries out the processing for measuring the supporting force acting on the supporting force sensor 30L out of the left leg link supporting force, i.e., the total lifting force share of the left leg link 3L on the basis of an output signal of the supporting force sensor 30L and the measurement value of the knee angle of the left leg link 3L, which have been input. Incidentally, these supporting force measurement processing means 62R and 62L correspond to the control target force measuring means in the present invention.

The arithmetic processing unit 51 is further provided with a right/left target share determining means 63 which receives the measurement values of the aforesaid measurement processing means 60R, 60L, 61R, 61L, 62R, and 62L and the operational signals of the aforesaid lifting force setting key switch 53 and the lifting control ON/OFF switch 54. The right/left target share determining means 63 is a means which carries out the processing for determining a target total lifting force, which is a target value of the aforesaid total lifting force (borne-by-the-device supporting force), on the basis of input values and for determining a target value of the share of each of the leg links 3 with respect to the above target total lifting force, i.e., a target value of the aforesaid total lifting force share of each of the leg links 3 (hereinafter referred to simply as a control target value). Incidentally, the control target value corresponds to a target share in the present invention. Further, the right/left target share determining means 63 combines the function as the target total lifting force determining means, the function as a distribution means, and the function as the device self weight compensation force estimating means in the present invention.

Furthermore, the arithmetic processing unit 51 is equipped with a right feedback manipulated variable determining means 64R which receives the total lifting force share of the right leg link 3R measured by the right supporting force measurement processing means 62R, the control target value of the right leg link 3R determined by the right/left target share determining means 63, and the knee angle of the right leg link 3R measured by the right knee angle measurement processing means 61R, a left feedback manipulated variable determining means 64L which receives the total lifting force share of the left leg link 3L measured by the left supporting force measurement processing means 62L, the control target value of the left leg link 3L determined by the right/left target share determining means 63, and the knee angle of the left leg link 3L measured by the left knee angle measurement processing means 61L, a right feedforward manipulated variable determining means 65R which receives the total lifting force share of the right leg link 3R measured by the right supporting force measurement processing means 62R, the control target value of the right leg link 3R determined by the right/left target share determining means 63, and the knee angle of the right leg link 3R measured by the right knee angle measurement processing means 61R, and a left feedforward manipulated variable determining means 65L which receives the total lifting force share of the left leg link 3L measured by the left supporting force measurement processing means 62L, the control target value of the left leg link 3L determined by the right/left target share determining means 63, and the knee angle of the left leg link 3L measured by the left knee angle measurement processing means 61L. Each of the feedback manipulated variable determining means 64 is a means which calculates a feedback manipulated variable (the feedback component of the indicated current value for each of the electric motors 27) from the difference between the measurement value and the control target value of the total lifting force share, which have been input, such that the difference converges to zero according to a predetermined feedback control law. Further, each of the feedforward manipulated variable determining means 65 is a means which calculates the feedforward manipulated variable (the feedforward component of the indicated current value for each of the electric motors 27) for bringing the measurement value of the total lifting force share to the control target value according to a predetermined feedforward control law from the measurement value and the control target value of the total lifting force share and the measurement value of the knee angle, which have been input.

Further, the arithmetic processing unit 51 is equipped with an addition processing means 66R which determines an indicated current value for the electric motor 27R of the right leg link 3R by adding the feedback manipulated variable calculated by the right feedback manipulated variable determining means 64R and the feedforward manipulated variable calculated by the right feedforward manipulated variable determining means 65R (by correcting the feedforward manipulated variable on the basis of the feedback manipulated variable), and an addition processing means 66L which determines an indicated current value for the electric motor 27L of the left leg link 3L by adding the feedback manipulated variable calculated by the left feedback manipulated variable determining means 64L and the feedforward manipulated variable calculated by the left feedforward manipulated variable determining means 65L (by correcting the feedforward manipulated variable on the basis of the feedback manipulated variable).

Incidentally, the feedback manipulated variable determining means 64R, 64L, the feed-forward manipulated variable determining means 65R, 65L, and the addition processing means 66R, 66L correspond to the actuator control means in the present invention.

The above has schematically described the arithmetic processing functions of the arithmetic processing unit 51.

Incidentally, an acceleration sensor 80 and the dashed-line arrows associated therewith illustrated in FIG. 4 and FIG. 5 are related to a second embodiment to be discussed later and therefore unnecessary for the present embodiment.

The control processing by the controller 50 in the present embodiment will now be explained, including the detailed explanation of the processing by the arithmetic processing unit 51. In the walking assistance device 1 of the present embodiment, when the power switch 56 is OFF, no driving force is imparted to the second joint 12 of each of the leg links 3. This allows the joints 10, 12 and 14 to freely move. In this state, the leg links 3 are folded by their own weights. In this state, each of the foot-mounted assemblies 15 is attached to each of the feet of the user A, then the user A or an attendant lifts the seat 2 to place it under the crotch of the user A.

Then, when the power switch 56 is turned on, electric power is supplied to each circuit of the controller 50, starting up the controller 50. Subsequently, when the lifting switch ON/OFF switch 54 is set to ON in this state, the arithmetic processing unit 51 carries out the processing explained below at a predetermined control processing interval.

At each control processing cycle, the arithmetic processing unit 51 first carries out the processing by the treading force measurement processing means 60R and 60L. This processing will be explained with reference to FIG. 6. FIG. 6 is a block diagram illustrating the processing flow of the treading force measurement processing means 60R and 60L. The processing algorithms of the treading force measurement processing means 60R and 60L are the same, so that the matters related to the left treading force measurement processing means 60L are indicated in parentheses in FIG. 6.

The processing by the right treading force measurement processing means 60R will be representatively explained. First, a detection value of the MP sensor 38R of the leg link 3R (the detection value of a force indicated by an output voltage value of the MP sensor 38R) and a detection value of the heel sensor 39R (the detection value of a force indicated by an output voltage of the heel sensor 39R) are passed through low-pass filters in S101 and S102, respectively. The low-pass filters are adapted to remove high-frequency components, such as noises, from the detection values of these sensors 38R and 39R. The cut-off frequency of the low-pass filters is, for example, 100 Hz.

Subsequently, the outputs of these low-pass filters are added in S103. Thus, a provisional measurement value FRF_p_R of the treading force of the right leg of the user A is obtained. The provisional measurement value FRF_p_R includes an error attributable mainly to the tightening of the shoelace of the right foot-mounted assembly 15R.

Therefore, according to the present embodiment, the provisional measurement value FRF_p_R is further subjected to conversion processing in S104. This provides a final measurement value FRF_R of the treading force of the right leg of the user A. The conversion processing in S104 is carried out according to the table shown in FIG. 7. More specifically, if FRF_p_R is a predetermined first threshold value FRF1 or less, then the measurement value FRF_R is set to zero. This prevents a minute error attributable mainly to the tightening of the shoelace of the foot-mounted assembly 15R from being obtained as the measurement value FRF_R. Further, if the provisional measurement value FRF_p_R is larger than the first threshold value FRF1 and a second threshold value FRF2 (>FRF1) or less, then the value of the measurement value FRF_R is linearly increased as the value of FRF_p_R increases. And, if FRF_p_R exceeds the second threshold value FRF2, then the value of FRF_R is held at a predetermined upper limit value (the value of FRF_R when FRF_p_R is equal to the second threshold value FRF2). The reason for setting the upper limit value of FRF_R will be described hereinafter.

The above has described the processing by the right treading force measurement processing means 60R. The same applies to the processing by the left treading force measurement processing means 60L.

The arithmetic processing unit 51 then sequentially carries out the processing by the knee angle measurement processing means 61R, 61L and the processing by the supporting force measurement processing means 62R, 62L. These processing will be explained below with reference to FIG. 8 and FIG. 9. FIG. 8 is a block diagram illustrating the flow of the processing by the knee angle measurement processing means 61R, 61L and the processing by the supporting force measurement processing means 62R, 62L. Incidentally, the processing algorithms of the knee angle measurement processing means 61R and 61L, respectively, are the same. The processing algorithms of the supporting force measurement processing means 62R and 62L, respectively, are also the same. Hence, the matters related to the left knee angle measurement processing means 61L and the left supporting force measurement processing means 62L are indicated in parentheses in FIG. 8.

The processing by the right knee angle measurement processing means 61R and the right supporting force calculating means 62R will be representatively explained below. First, the processing in S201 and S202 is carried out by the right knee angle measurement processing means 61R to obtain a measurement value of a knee angle $\theta 1\_R$ (the bending angle of the leg link 3R in the second joint 12R) of the right leg link 3R. In S201, a provisional measurement value $\theta 1p\_R$ of the knee angle of the leg link 3R is calculated from an output of the rotary encoder 28R.

Here, referring to FIG. 9, in the present embodiment, an angle $\theta 1\_R$ formed by a line segment S1, which connects the central point P related to the first joint 10R of the leg link 3R (a point P which provides a rotational center of the longitudinal swing motions of the thigh frame 11R and which will be hereinafter referred to as the longitudinal swing central point P) and the central point of a second joint 12R, and a line segment S2, which connects the central point of the second joint 12R and the central point of a third joint 14R is measured as the knee angle of the right leg link 3R. The same applies to the knee angle of the left leg link 3L. FIG. 9 schematically illustrates the construction of the major section of the leg link 3.

In this case, in the aforesaid S201, the rotational position of the second joint 12R in a state wherein the thigh frame 11R and the crus frame 13R of the leg link 3R have a predetermined posture relationship (e.g., the posture state of FIG. 1), that is, in a state wherein the knee angle $\theta 1\_R$ is a predetermined value, provides the reference. Thus, the amount of rotation from the reference rotational position (the amount of change in rotational angle, which is proportional to the rotational amount of the rotor of the electric motor 27R) is measured from an output signal of the rotary encoder 28R. Then, the value obtained by adding the measured rotational amount of the second joint 12R to the value of the knee angle of the leg link 3R at the aforesaid reference rotational position (this is stored and retained beforehand in a memory, which is not illustrated) is determined as the provisional measurement value $\theta 1p\_R$.

The provisional measurement value $\theta 1p\_R$ sometimes includes a high-frequency noise component. Further, therefore, the $\theta 1p\_R$ is passed through a low-pass filter in S202 to finally obtain the knee angle measurement value $\theta 1\_R$ of the leg link 3R.

The above has described the processing by the right knee angle measurement processing means 61R. The same applies to the left knee angle measurement processing means 61L.

Supplementally, the reason for measuring the angle $\theta 1$ formed by the line segments S1 and S2 as the knee angle of the leg link 3 in the present embodiment is because the measurement value of the angle $\theta 1$ is used mainly for the processing by the right/left target share determining means 63, which will be described in detail later.

However, in the walking assistance device 1 in the present embodiment, the angle formed by the axial center of the thigh frame 11 of each of the leg links 3 and the line segment S1 remains constant. Hence, the knee angle measurement processing means 61 may determine the angle formed by, for example, the axial center of the thigh frame 11 of the leg link 3 and the line segment S2 related to the crus frame 13 as the knee angle of the leg link 3. Then, the aforesaid angle $\theta 1$ may be determined from the knee angle by, for example, the processing carried out by the right/left target share determining means 63, which will be described later.

After the knee angle measurement value θ1_R of the leg link 3R is determined as described above, the processing by the right supporting force measurement processing means 62R is carried out in S203. In this processing, a measurement value Fankle_R of the supporting force acting on the supporting force sensor 30R (i.e., the total lifting force share of the leg link 3R) is calculated from the knee angle measurement value θ1_R obtained in S202 and a detection value of the supporting force sensor 30R (a two-axis force detection value indicated by a voltage value of an output signal of the supporting force sensor 30R). This processing will be explained in detail with reference to FIG. 9 mentioned above.

The supporting force (the total lifting force share) Fankle_R acting on the supporting force sensor 30R of the leg link 3R is substantially equal to a translational force acting on the crus frame 13R from the third joint 14R of the leg link 3R. Further, the direction of the translational force and, by extension, the direction of Fankle_R will be parallel to a line segment S3 connecting the central point of the third joint 14 of the leg link 3R and the aforesaid longitudinal swing central point P in the walking assistance device 1 of the present embodiment.

Meanwhile, the supporting force sensor 30R detects a force Fz in the direction of a z-axis perpendicular to the surface (the upper surface or the lower surface) of the supporting force sensor 30R and a force Fx in the direction of an x-axis which is perpendicular to the z-axis and parallel to the surface of the supporting force sensor 30R, as illustrated. The x-axis and the z-axis are coordinate axes secured to the supporting force sensor 30R and are axes parallel to a plane which includes the circular arc of the guide rail 22. At this time, the Fz and Fx to be detected are a component in the z-axis direction and a component in the x-axis direction, respectively, of Fankle_R. Accordingly, if the angle formed by Fankle_R and the z-axis is denoted by θk, as illustrated, then Fankle_R may be calculated according to expression (1) given below from the detection values of Fz and Fx and θk.

$$Fankle\_R = Fx \cdot \sin \theta k + Fz \cdot \cos \theta k \quad (1)$$

Further, the angle θk is determined as follows. If the angle formed by the line segment S2 and the line segment S3 (=the angle formed by the direction of Fankle and the line segment S2) is denoted by θ2, then lengths L1 and L2 of the line segments S1 and S2, respectively, in a triangle having the line segments S1, S2 and S3 as the three sides thereof will have fixed values (known values determined in advance). Further, the angle θ1 formed by the line segments S1 and S2 is the measurement value θ1_R obtained as described above by the right knee angle measurement processing means 61R. Thus, the angle θ2 is determined by geometric calculation from the lengths L1 and L2 of the line segments S1 and S2, respectively (the values of which are stored and retained in a memory beforehand), and the measurement value θ1_R of, the angle θ1.

To be specific, in the triangle having the line segments S1, S2 and S3 as the three sides thereof, the relational expressions of (2) and (3) given below hold. L3 denotes the length of the line segment S3.

$$L3^2 = L1^2 + L2^2 - 2 \cdot L1 \cdot L2 \cdot \cos \theta 1 \quad (2)$$

$$L1^2 = L2^2 + L3^2 - 2 \cdot L2 \cdot L3 \cdot \cos \theta 2 \quad (3)$$

Accordingly, L3 can be calculated according to expression (2) from the values of L1 and L2 and a measurement value of the angle θ1. Further, the angle θ2 can be calculated according to expression (3) from the calculated value of L3 and the values of L1 and L2.

In addition, when the angle formed by the z-axis and the line segment S2 is denoted by θ3, the angle θ3 takes a fixed value which is determined beforehand by the angle at which the supporting force sensor 30 is mounted relative to the crus frame 13. Then, the value of the angle θk required for the calculation of expression (1) is determined by subtracting the angle θ2 calculated as described above from the angle θ3 having the fixed value (this value is stored and retained beforehand in a memory, which is not illustrated).

Accordingly, in the present embodiment, the processing in S203 by the right supporting force measurement processing means 62R provides the measurement value Fankle_R of the total lifting force share of the right leg link 3R according to the aforesaid expression (1) from the θk calculated as described above and the detection values Fx and Fz of the supporting force sensor 30 of the leg link 3R.

The above has described in detail the processing in S203 by the right supporting force measurement processing means 62R. The same applies to the left supporting force measurement means 62L.

In the present embodiment, the measurement value Fankle of the total lifting force share of each of the leg links 3 has been obtained according to the aforesaid expression (1), using a three-axis force sensor or a two-axis force sensor as the supporting force sensor 30. However, the measurement value Fankle can be obtained even if the supporting force sensor 30 uses a one-axis force sensor. For instance, if the supporting force sensor 30 uses a sensor which detects only the force Fx in the x-axis direction in FIG. 9, then the measurement value Fankle can be determined according to expression (4) given below. If the supporting force sensor 30 is a sensor which detects only the force Fz in the z-axis direction in FIG. 9, then the measurement value Fankle can be determined according to expression (5) given below.

$$Fankle = Fx / \sin \theta k \quad (4)$$

$$Fankle = Fz / \cos \theta k \quad (5)$$

However, when using the expression (4) or (5), the accuracy of the value of Fankle deteriorates as the angle θk approaches zero degree or 90 degrees. For this reason, the measurement value of Fankle is desirably obtained by the aforesaid expression (1).

Further, the measurement value Fankle may alternatively be obtained by determining the square root of the sum of the squared value of Fx and the squared value of Fz. In this case, the measurement value θ1 of the knee angle is unnecessary.

Supplementally, the processing by the measurement processing means 60, 61 and 62 explained above does not necessarily have to be carried out in order. For instance, the processing by the measurement processing means 60, 61 and 62 may be carried out in parallel by time sharing or the like. However, if θ1 is used in the processing by the supporting force measurement processing means 62R or 62L, then the processing by the knee angle measurement processing means 61R or 61L must be carried out before the processing by the supporting force measurement processing means 62R or 62L.

In the present embodiment, the supporting force sensor 30 for measuring the total lifting force share of each of the leg links 3 has been interposed between the third joint 14 and the crus frame 13 (more accurately, the upper crus frame 13a). Alternatively, however, the supporting force sensor may be interposed between the third joint 14 and the foot-mounted assembly 15 (e.g., between the third joint 14 and the joining portion 34 of the foot-mounted assembly 15). In this case, the supporting force acting on the crus frame 13 from the third joint 14 can be measured by measuring the rotational angle of the third joint 14 and then coordinate-converting the supporting force detected by the supporting force sensor between the third joint 14 and the foot-mounted assembly 15.

Subsequently, the arithmetic processing unit 51 implements the processing by the right/left target share determining means 63. This processing will be explained in detail with reference to FIG. 10. FIG. 10 is a block diagram illustrating the flow of the processing by the right/left target share determining means 63.

In S301, the set value of the lifting force given by operating the key switch 53 is passed through a low-pass filter. The cutoff frequency of the low-pass filter is, for example, 0.5 Hz. Thus, a target lifting force, which is the target value of the lifting force to be applied to the user A from the seat 2, is determined. The low-pass filter in S301 is adapted to prevent a sudden change in the lifting force to be applied to the user A from the seat 2 in, for example, a case where the set value of the lifting force is changed. If the set value of the lifting force is maintained constant, then the set value is directly determined as a target lifting force.

Subsequently, in S302, the aforesaid device self weight compensation force, which is the supporting force against the sum of the gravity acting on the walking assistance device 1 and an inertial force occurring in the walking assistance device 1, is estimated. The processing for the estimation will be discussed hereinafter.

Then, in S303, the estimated value of the device self weight compensation force is added to the target lifting force thereby to determine the target total lifting force, which is the target value of the total lifting force.

Although not illustrated, in the present embodiment, when the aforesaid lifting control ON/OFF switch 54 is OFF, the value obtained by adding the measurement value Fankle_R of the total lifting force share of the right leg link 3R and the measurement value Fankle_L of the total lifting force share of the left leg link 3L determined as described above by the individual supporting force measurement processing means 62 (the value corresponds to the measurement value of the total lifting force) is passed through a low-pass filter having the same characteristics as those of the low-pass filter in S301 described above, thereby determining the target total lifting force. Hence, the target total lifting force in this case is always determined such that a current actual total lifting force is maintained.

Meanwhile, in S304, the distribution ratio, which is the ratio for dividing the target total lifting force between the right and left leg links 3, is determined on the basis of the magnitude of the measurement value FRF_R of the treading force of the right leg and the magnitude of the measurement value FRF_L of the treading force of the left leg, which have been determined as described above by the individual treading force measurement processing means 60. This distribution ratio is composed of a right distribution ratio of the target total lifting force, which is the distribution proportion for the right leg link 3R, and a left distribution ratio, which is the distribution proportion for the left leg link 3L. The sum of the two distribution ratios is 1.

In this case, the right distribution ratio is determined to be the ratio of the magnitude of FRF_R relative to the sum of the magnitude of the measurement value FRF_R and the magnitude of the measurement value FRF_L, that is, FRF_R/(FRF_R+FRF_L). Similarly, the left distribution ratio is determined to be the ratio of the magnitude of FRF_L relative to the sum of the magnitude of the measurement value FRF_R and the magnitude of the measurement value FRF_L, that is, FRF_L/(FRF_R+FRF_L). In this case, if one leg of the user A is a standing leg, while the other leg is a free leg (i.e., a single-stance state), then the distribution ratio associated with the leg which is the free leg is zero, while the distribution ratio associated with the leg which is the standing leg is 1.

Here, the reason for setting the upper limit value of the measurement value FRF of the treading force of each leg in the conversion processing in S104 by each of the treading force measurement processing means 60 (refer to FIG. 6) will be explained. In a state wherein both legs of the user A become standing legs (i.e., a double-stance state), the provisional measurement value FRF_p of the treading force of each leg generally tends to develop frequent fluctuations rather than smoothly changing. In such a case, if the right and left distribution ratios are determined on the basis of the provisional measurement value FRF_p, then the distribution ratios frequently change, leading to frequent changes in the share ratios of the leg links 3 in a target total lifting force. As a result, minute fluctuations in the lifting force acting on the user A from the seat 2 tend to occur. As a result, the minute fluctuations may cause the user A to feel uncomfortable. For this reason, according to the present embodiment, the upper limit value of the measurement value FRF of the treading force of each leg is set to prevent the situation wherein the right and left distribution ratios frequently change in the double-stance state. In this case, both the right and left distribution ratios will be basically maintained at ½ except for a period immediately after a start and a period immediately before an end in the state of a double-stance period, thus resulting in stable right and left distribution ratios.

In FIG. 7 described above, if only the threshold value FRF1 is available and the provisional measurement value FRF_p_R (L) of the treading force of each leg of the user A is the threshold value FRF1 or more, then the measurement value FRF_R(L) may be acquired on the basis of a table established such that the measurement value FRF_R(L) of the treading force linearly increases. The threshold values FRF1, FRF2 and the like of the table for obtaining FRF_R(L) from the provisional measurement value FRF_p may be appropriately determined according to a lifting force feeling favored by the user A, the weight of the walking assistance device 1, the calculating capability of the controller 50, and the like.

Supplementally, the right distribution ratio and the left distribution ratio determined by the processing in S304 are used in the aforesaid processing in S302 in the present embodiment. Hence, the processing in S304 is carried out before the processing in S302 and S303.

Returning to the explanation in FIG. 10, subsequently, the processing in S305 and S306 related to the right leg link 3R and the processing in S307 and S308 related to the left leg link 3L are carried out. In the processing in S305 and S306 related to the right leg link 3R, first, in S305, the target total lifting force determined in S303 described above is multiplied by the right distribution ratio. Thus, a provisional target value Tp_Fankle_R of the total lifting force share as the share borne by the right leg link 3R out of the target total lifting force is determined. Then, the provisional target value Tp_Fankle_R is passed through a low-pass filter in S306 to finally determine a control target value T_Fankle_R, which is the target value of the total lifting force share of the right leg link 3R. The low-pass filter in S306 is adapted to remove noise components attributable mainly to fluctuations in the knee angle θ1. The cutoff frequency thereof is, for example, 15 Hz.

Similarly, in the processing in S307 and S308 related to the left leg link 3L, first, the target total lifting force determined in S303 described above is multiplied by the left distribution ratio in S307. Thus, a provisional target value Tp_Fankle_L of the total lifting force share as the share borne by the left leg link 3L out of the target total lifting force is determined. Then, the provisional target value Tp_Fankle_L is passed through a low-pass filter in S308 to finally determine a control target value T_Fankle_L, which is the target value of the total lifting force share of the left leg link 3L.

The aforesaid processing in S302 is implemented as described below in the present embodiment. FIG. 11 is a block diagram illustrating the flow of the estimation processing.

In the processing of S302 in the present embodiment, the measurement values θ1 of the knee angles of the leg links 3 determined by the knee angle measurement processing means 61 and the distribution ratios determined by the processing in S304 described above are used to estimate a device self weight compensation force. To be specific, first, the processing in S1001 and S1002 is carried out. In S1001, the knee angle measurement value θ1_R of the leg link 3R determined by the right knee angle measurement processing means 61R is multiplied by the right distribution ratio determined in S304. Similarly, in S1002, the knee angle measurement value θ1_L of the leg link 3L determined by the left knee angle measurement processing means 61L is multiplied by the left distribution ratio determined in S304. Then, the values of the calculation results in S1001 and S1002, respectively, are added up in S1003. The value obtained by the addition is determined as a knee representative angle (corresponding to the representative value of the second joint displacement amount in the present invention). In other words, the knee representative angle is a weighted average value of the knee angle measurement values θ1_R and θ1_L using a right distribution ratio and a left distribution ratio as the weight coefficients thereof. The knee representative angle determined as described above has a close correlation with the vertical position (the position in height from a floor) of the center of gravity of the walking assistance device 1, that is, a device self weight compensation force.

Hence, in the present embodiment, subsequently, in S1004, the position (the vertical position) of the center of gravity of the walking assistance device 1 (hereinafter referred to as the device center of gravity) is determined on the basis of the aforesaid knee representative angle. In this case, the vertical position of the device center of gravity (the height of the center of gravity from a floor) is determined according to a preset correlation table (a table showing the correlation between the knee representative angle and the vertical position of the center of gravity of the walking assistance device 1) from, for example, a knee representative angle. Alternatively, the vertical position of the center of gravity of the walking assistance device 1 may be calculated by geometric computation using, for example, a rigid link model formed by connecting two rigid elements by a joint corresponding to a knee joint (a rigid link model in which the angle between the two rigid elements agrees with the aforesaid knee representative angle, one of the rigid elements has a weight equivalent to the weight of the entire upper portion above the second joint 12 of each of the leg links 3 of the walking assistance device 1, and the other of the rigid elements has a weight equivalent to the weight of the entire lower portion below the second joint 12).

Subsequently, the position of the device center of gravity determined as described above is subjected to the second order differential in S1005 thereby to calculate the vertical acceleration (motional acceleration) of the device center of gravity. Then, the sum of the acceleration and the gravitational acceleration (constant) of the device center of gravity is calculated in S1006. Further, the value of the calculation result in S1006 is multiplied by the device total mass, which is the total weight of the walking assistance device 1, in S1007, and the value of the multiplication result is obtained as the estimated value of the device self weight compensation force.

Estimating the device self weight compensation force as described above allows the device self weight compensation force to be easily estimated by a simple technique.

The above has described in detail the processing, including S302, by the right/left target share determining means 63. Supplementally, the processing in S301 to S303 corresponds to the target total lifting force determining means in the present invention. Further, the processing in S304 to S308 corresponds to the distributing means in the present invention. The processing in S302 corresponds to the device self weight compensation force estimating means in the present invention.

After carrying out the processing by the right/left target share determining means 63 as described above, the arithmetic processing unit 51 carries out the processing by the feedback manipulated variable determining means 64R, 64L and the feedforward manipulated variable determining means 65R, 65L in sequence or in parallel.

The processing by the feedback manipulated variable determining means 64R, 64L will be explained with reference to FIG. 12. FIG. 12 is a block diagram illustrating the flow of the processing by the feedback manipulated variable determining means 64R and 64L. Incidentally, the algorithms of the feedback manipulated variable determining means 64R and 64L are the same, so that the matters related to the left feedback manipulated variable determining means 64L are indicated by being parenthesized in FIG. 12.

The processing by the right feedback manipulated variable determining means 64R will be representatively explained. First, the difference between the control target value T_Fankle_R of the right leg link 3R determined by the right/left target share determining means 63 and the measurement value Fankle_R of the total lifting force share of the right leg link 3R measured by the right supporting force measurement processing means 62 (T_Fankle_R−Fankle_R) is calculated in S401. Then, the difference is multiplied by gains Kp and Kd, respectively, in S402 and S403. Further, the calculation result of S403 is differentiated in S404 ("s" in the figure denotes a differential operator), and the differential value and the calculation result are added in S405. Thus, a manipulated variable Ifb_R of the current of the right electric motor 27 is calculated by PD control law serving as a feedback control law such that the difference (T_Fankle_R-Fankle_R) converges to zero. The manipulated variable Ifb_R means a feedback component of an indicated current value of the right electric motor 27.

In this case, according to the present embodiment, the values of the gains Kp and Kd are variably set in S406 according to the knee angle measurement value θ1_R of the leg link 3R. The reason for this is because the sensitivity of a change in the lifting force of the seat 2 to a change in current (change in torque) of the electric motor 27R changes according to the knee angle of the leg link 3R. In this case, the sensitivity of a change in the lifting force of the seat 2 to a change in current (change in torque) of the electric motor 27R increases as the knee angle θ1_R increases (as the leg link 3R stretches). Hence, in S406, the values of the gains Kp and Kd are set according to a data table, which is not shown, such that, basically, the values of the gains Kp and Kd are respectively decreased as the knee angle measurement value θ1_R of the leg link 3R increases.

The above has described the processing by the right feedback manipulated variable determining means 64R. The same applies to the processing by the left feedback manipulated variable determining means 64L. In the present embodiment, the PD control law has been used as the feedback control law; however, a feedback control law other than the PD control law (e.g., the PID control law) may alternatively be used.

The processing by the feedforward manipulated variable determining means 65R and 65L will now be explained with reference to FIG. 13. FIG. 13 is a block diagram illustrating the flow of the processing by the feedforward manipulated variable determining means 65R and 65L. Incidentally, the algorithms of the feedforward manipulated variable determining means 65R and 65L are the same, so that the matters related to the left feedforward manipulated variable determining means 65L are indicated in parentheses in FIG. 13.

The processing by the right feedforward manipulated variable determining means 65R will be representatively explained. In S501, the knee angle measurement value θ1_R of the leg link 3R measured by the knee angle measurement processing means 61R is differentiated. Thus, a knee angle angular velocity ω1_R of the leg link 3R is calculated. Further, in S502, the knee angle measurement value θ1_R of the leg link 3R and the total lifting force share measurement value Fankle_R of the leg link 3R measured by the supporting force measurement processing means 62R are used to calculate an actual tension T1, which is the actual tension of the wires 32*a* and 32*b* of the leg link 3R. The processing for calculating the actual tension T1 will be explained with reference to FIG. 14. Incidentally, the leg link 3 is schematically illustrated in FIG. 14. Further, in FIG. 14, the same elements as those in FIG. 9 are assigned the same reference numerals.

First, a component Fankle_a which is orthogonal to the line segment S2 of the total lifting force share measurement value Fankle_R of the leg link 3R is calculated according to expression (6) given below.

$$Fankle\_a = Fankle\_R \cdot \sin\theta 2 \quad (6)$$

The angle θ2 is an angle formed by Fankle_R and the line segment S2, and this θ2 is calculated by geometric calculation using the measurement value θ1_R, as explained with reference to the aforesaid FIG. 9 (refer to the aforesaid expressions (2) and (3)).

Then, Fankle_a determined as described above is multiplied by the length L2 of the line segment S2 according to expression (7) given below. Thus, a moment M1 generated in the second joint 12 (the knee joint) is calculated by Fankle_R.

$$M1 = Fankle\_a \cdot L2 \quad (7)$$

The moment generated at the pulley 31 by the actual tension T1 of the wires 32*a* and 32*b* balances the aforesaid moment M1 in a steady state. Therefore, further, the moment M1 is divided by an effective radius r of the pulley 31 according to expression (8) given below thereby to calculate the actual tension T1 of the wires 32*a* and 32*b*.

$$T1 = M1/r \quad (8)$$

The above has described in detail the processing in S502.

Returning to the explanation of FIG. 13, further, in S503, a target tension T2 of the wires 32*a* and 32*b* of the leg link 3R is calculated. The target tension T2 is a tension to be generated at the wires 32*a* and 32*b* on the basis of the control target value (the target value of a total lifting force share) of the leg link 3R determined by the processing by the right/left target lifting force determining means 63. The calculation of the target tension T2 is the same as the calculation processing in S502. More specifically, a component orthogonal to the aforesaid line segment S2 (refer to FIG. 14) of the control target value T_Fankle_R is calculated by an expression in which Fankle_R of the right side of the aforesaid expression (6) has been replaced by a control target value T_Fankle_R of the leg link 3R determined by the processing performed by the right/left target lifting force determining means 63. Then, the calculated component is used in place of Fankle_a of the right side of the aforesaid expression (7) to calculate a target moment of the second joint 12 of the leg link 3R. Further, the target moment is used in place of M1 of the right side of the aforesaid expression (8) thereby calculating the target tension T2 of the wires 32*a* and 32*b*.

The above has described the processing in S503.

After carrying out the processing in S501 to S503 as described above, in S504, an angular velocity ω1_R of the second joint 12 and the actual tension T1 and the target tension T2 of the wires 32*a* and 32*b*, which have been calculated as described above, are used to determine a current manipulated variable Iff_R of the electric motor 27R by predetermined feedforward processing. The manipulated variable Iff_R means a feedforward component of an indicated current value of the electric motor 27R.

The processing in S504 calculates the manipulated variable Iff_R by a model formula represented by expression (9) given below.

$$\mathit{Iff\_R} = B1 \cdot T2 + B2 \cdot \omega 1\_R + B3 \cdot sgn(\omega 1\_R) \quad (9)$$

where B2=b0+b1·T1, B3=d0+d1·T1

Here, B1 in expression (9) denotes a coefficient of a constant, and B2 and B3 respectively denote coefficients represented by linear functions of the actual tension T1, as indicated by the note of expression (9). Incidentally, b0, b1, d0 and d1 are constants. Further, sgn( ) denotes a sign function.

This expression (9) is a model formula representing the relationship among the current of the electric motors 27, the tensions of the wires 32*a* and 32*b*, and the angular velocity ω1 of the second joint 12. More specifically, the first term of the right side of expression (9) means a proportional term of tension, the second term means a term based on the viscous frictional force between the wires 32*a* and 32*b* and the pulley 31, and the third term means a term based on a dynamic frictional force between the wires 32*a* and 32*b* and the pulley 31. Incidentally, a term based on the angular acceleration of the second joint 12 (i.e., a term based on an inertial force) may be further added to the right side of expression (9).

Supplementally, the constants B1, b0, b1, d0, and d1 used for the calculation of expression (9) are experimentally identified beforehand by an identification algorithm which minimizes the square value of the difference between a value of the left side and a value of the right side of expression (9). Then, the identified constants B1, b0, b1, d0, and d1 are stored and retained in a memory, not shown, and used when the walking assistance device 1 is actuated.

The above has described the processing by the right feedforward manipulated variable determining means 65R. The same applies to the processing by the left feedforward manipulated variable determining means 65L.

Referring to FIG. 5, after the current manipulated variables Ifb_R, Iff_R of the electric motor 27R and the current manipulated variables Ifb_L, Iff_L of the electric motor 27L are calculated as described above, the arithmetic processing unit 51 adds the manipulated variables Ifb_R and Iff_R by the addition processing means 66R to determine an indicated current value of the electric motor 27R. Further, the arithmetic processing unit 51 adds the manipulated variables Ifb_L and Iff_L by the addition processing means 66L to determine an indicated current value of the electric motor 27L. Then, the arithmetic processing unit 51 then outputs the indicated current values to the driver circuits 52 associated with the individual electric motors 27. At this time, the driver circuits 52 energize the electric motors 27 on the basis of the given indicated current values.

The control processing by the arithmetic processing unit 51 explained above is carried out at predetermined control processing cycles. Thus, the torques to be generated at the electric motors 27 and the driving forces of the second joints 12 (knee joints) of the leg links 3 are manipulated such that the actual total lifting force share measurement value Fankle of each of the leg links 3 agrees with (converges to) the control target value T_Fankle for the leg link 3.

In this case, the sum of the control target values T_Fankle_R and T_Fankle_L associated with the right and left leg links 3R and 3L agrees with the target total lifting force. Further, the target total lifting force is the force obtained by adding the aforesaid device self weight compensation force to the target value of a lifting force set by the lifting force setting key switch 53. Hence, the torques to be generated at the electric motors 27R and 27L will be controlled such that the total sum of the supporting forces acting on the leg links 3R and 3L from a floor (≈total sum of the leg link supporting forces) becomes a target total lifting force.

As a result, the lifting force actually acting on the user A from the seat 2 can be properly controlled to a target value while having the walking assistance device 1 bear a supporting force against the sum of the gravity acting on the walking assistance device 1 and an inertial force (vertical inertial force) generated in the walking assistance device 1. In other words, it is possible to have a target lifting force act on the user A from the seat 2 by properly compensating for the influences of an inertial force generated at the walking assistance device 1 or the gravity acting on the walking assistance device 1.

Further, the aforesaid control target values T_Fankle as the shares of a target total lifting forces borne by the individual leg links 3 are determined on the basis of the proportion of the treading force measurement values FRF_R and FRF_L such that the ratio between the right control target value T_Fankle_R and the left control target value T_Fankle_L agrees with the ratio between the right leg treading force measurement value FRF_R and the left leg treading force measurement value FRF_L of the user A. Therefore, the share of a target total lifting force borne by each of the leg links 3 can be set according to the motions of the legs intended by the user A and the lifting force to the user A from the seat 2 can be smoothly and stably applied to the user A.

A second embodiment of the present invention will now be explained. The present embodiment differs from the aforesaid first embodiment only partly in construction and processing. Therefore, the explanation will be focused mainly on the different aspects, and the explanation of the same portions of the construction or the processing as those of the first embodiment will be omitted.

Referring to FIG. 1 described above, the present embodiment is provided with an acceleration sensor 80 mounted on a predetermined portion of the seat 2 (e.g., a lower surface portion), and an output (acceleration detection value) of the acceleration sensor 80 is input to an arithmetic processing unit 51, as indicated by the dashed-line arrow in FIG. 4. Incidentally, the acceleration sensor 80 is a sensor capable of detecting vertical accelerations, and an acceleration detection value thereof includes a gravitational acceleration component.

An acceleration detection value input from the acceleration sensor 80 into the arithmetic processing unit 51 is used in the processing by the right/left target share determining means 63 (refer to the dashed-line arrow in FIG. 5). More detailedly, in the present embodiment, an acceleration detection value (vertical acceleration detection value) of the acceleration sensor 80 is used to estimate a device self weight compensation force in S302 in FIG. 10 described above.

FIG. 15 is a block diagram illustrating the flow of the processing for estimating a device self weight compensation force in the present embodiment. This estimation processing uses an acceleration detection value of the acceleration sensor 80 and a knee angle measurement value $\theta 1$ of each of leg links 3 determined by each of the knee angle measurement processing means 61. The estimation processing will be schematically explained. A walking assistance device 1 is handled as an aggregate of a part composed of a seat 2 and a member secured thereto (hereinafter referred to as the device base assembly), a part which includes a right leg link 3R and which is movable integrally with the right leg link 3R relatively to the seat 2 (hereinafter referred to as the device right leg assembly), and a part which includes a left leg link 3L and which is movable integrally with the left leg link 3L relatively to the seat 2 (hereinafter referred to as the device left leg assembly). In the walking assistance device 1 having the construction illustrated in FIG. 1 described above, the device right leg assembly includes an electric motor 27R and a foot-mounted assembly 15R, while the device left leg assembly includes an electric motor 37L and a foot-mounted assembly 15L. If the electric motors 27R and 27L are secured to the seat 2, then the electric motors 27R and 27L will be included in the device base assembly. Hereinafter, each of the device base assembly, the device right leg assembly, and the device left leg assembly may be generically referred to as the device constituent assembly.

Then, the actual vertical acceleration (including a gravitational acceleration component) of the center of gravity of each of the device constituent assemblies is detected or estimated. Further, the vertical acceleration (absolute acceleration) of each device constituent assembly is multiplied by the weight of the device constituent assembly thereby to estimate a supporting force against the sum of the gravity acting on the device constituent assembly and a vertical inertial force generated in the device constituent assembly. The supporting force means a component attributable to the weight of the device constituent assembly in the aforesaid device self weight compensation force, and this supporting force will be hereinafter referred to as a device assembly self weight compensation force. Further, the estimated value of the device assembly self weight compensation force of every device constituent assembly is added up to determine the estimated value of the device self weight compensation force.

The following will specifically explain the estimation processing with reference to FIG. 15.

First, the processing for determining (estimating) the vertical relative acceleration of the center of gravity of the device right leg assembly with respect to the seat 2 in S2001 and S2002 and the processing for determining (estimating) the vertical relative acceleration of the center of gravity of the device left leg assembly with respect to the seat 2 in S2003 and S2004 are carried out in sequence or in parallel.

More specifically, in S2001, the relative position (vertical relative position) of the center of gravity of the device right leg assembly with respect to the seat 2 is determined from a knee angle measurement value $\theta 1\_R$ of the leg link 3R determined by the right knee angle measurement processing means 61R. In this case, correlation data representing a correlation between the relative position (vertical relative position) of the center of gravity of the device right leg assembly with respect to the seat 2 and the knee angle of the leg link 3R in a state wherein, for example, the lower end portion of the leg link 3R (the foot-mounted assembly 15R) is positioned directly under the seat 2 is set beforehand and stored and retained in a memory, which is not shown. Further, in S2001, the relative position (vertical relative position) of the center of gravity of the device right leg assembly with respect to the seat 2 is determined from the measurement value θ1_R according to the correlation data.

Then, the time series of the relative position of the center of gravity of the device right leg assembly determined as described above is subjected to the second order differential in S2002 so as to estimate the vertical relative acceleration of the center of gravity of the device right leg assembly with respect to the seat 2.

Similarly, in S2003, the relative position (vertical relative position) of the center of gravity of the device left leg assembly with respect to the seat 2 is determined from the knee angle measurement value θ1_L of the leg link 3L determined by the left knee angle measurement processing means 61L according to preset correlation data (correlation data representing the correlation between the relative position (vertical relative position) of the center of gravity of the device left leg assembly with respect to the seat 2 and the knee angle of the leg link 3L in a state wherein the lower end portion of the leg link 3L (the foot-mounted assembly 15L) is positioned directly below the seat 2). Then, the time series of the relative position of the center of gravity of the device left leg assembly determined as described above is subjected to the second order differential in S2004 so as to estimate the vertical relative acceleration of the center of gravity of the device left leg assembly with respect to the seat 2.

Subsequently, the processing in S2005 and S2006 is carried out. In S2005, the acceleration detection value of the acceleration sensor 80 is added to the relative acceleration of the device right leg assembly determined in the aforesaid S2002 so as to determine the vertical acceleration (absolute acceleration) of the device right leg assembly. Similarly, in S2006, the acceleration detection value of the acceleration sensor 80 is added to the relative acceleration of the device left leg assembly determined in the aforesaid S2004 thereby to estimate the vertical acceleration (absolute acceleration) of the device left leg assembly.

Incidentally, the acceleration sensor 80 is attached to the seat 2, so that an acceleration detection value of the acceleration sensor 80 means the detection value of the absolute acceleration (vertical absolute acceleration) of the center of gravity of the device base assembly.

Subsequently, the processing in S2007, S2008, S2009, and 2010 is carried out.

In S2007, the acceleration detection value of the acceleration sensor 80, that is, the vertical acceleration detection value of the device base assembly, is multiplied by the weight of the device base assembly. Thus, the device assembly self weight compensation force related to the device base assembly is determined. Further, in S2008, the estimated value of the vertical acceleration of the device right leg assembly determined in S2005 is multiplied by the weight of the device right leg assembly. Thus, the device assembly self weight compensation force related to the device right leg assembly is determined. Further, in S2009, the estimated value of the vertical acceleration of the device left leg assembly determined in S2006 is multiplied by the weight of the device left leg assembly. Thus, the device assembly self weight compensation force related to the device left leg assembly is determined.

Further, in S2010, the device assembly self weight compensation forces of the device base assembly, the device right leg assembly, and the device left leg assembly determined as described above are added up. This provides the estimated value of the device self weight compensation force.

The construction and processing other than those explained above are the same as those of the aforesaid first embodiment.

The present embodiment is also capable of providing the same advantages as those of the aforesaid first embodiment. Further, especially when estimating the device self weight compensation force, the use of an acceleration detection value given by the acceleration sensor 80 in addition to the knee angle measurement value θ1 of each leg link 3 permits more accurate estimation of a device self weight compensation force. As a result, a lifting force can be controlled to a target value with higher accuracy.

In the embodiments explained above, each of the leg links 3 has been provided with the first to the third joints 10, 12 and 14; alternatively, however, each of the leg links 3 may be provided with more joints. In that case, however, actuators for driving the joints in addition to the joint which connects the leg links to the seat (the lifting force transmitting assembly) and the joints which connect the leg links to the foot-mounted assemblies will be required.

Furthermore, the supporting force sensor 30 has been used to measure the share of a supporting force of each leg link; alternatively, however, a dynamic model of the walking assistance device 1 may be used to estimate the shares of the supporting force.

INDUSTRIAL APPLICABILITY

As described above, the present invention is useful in providing a walking assistance device capable of properly assisting a walking motion of a user thereof.

Figure 1:
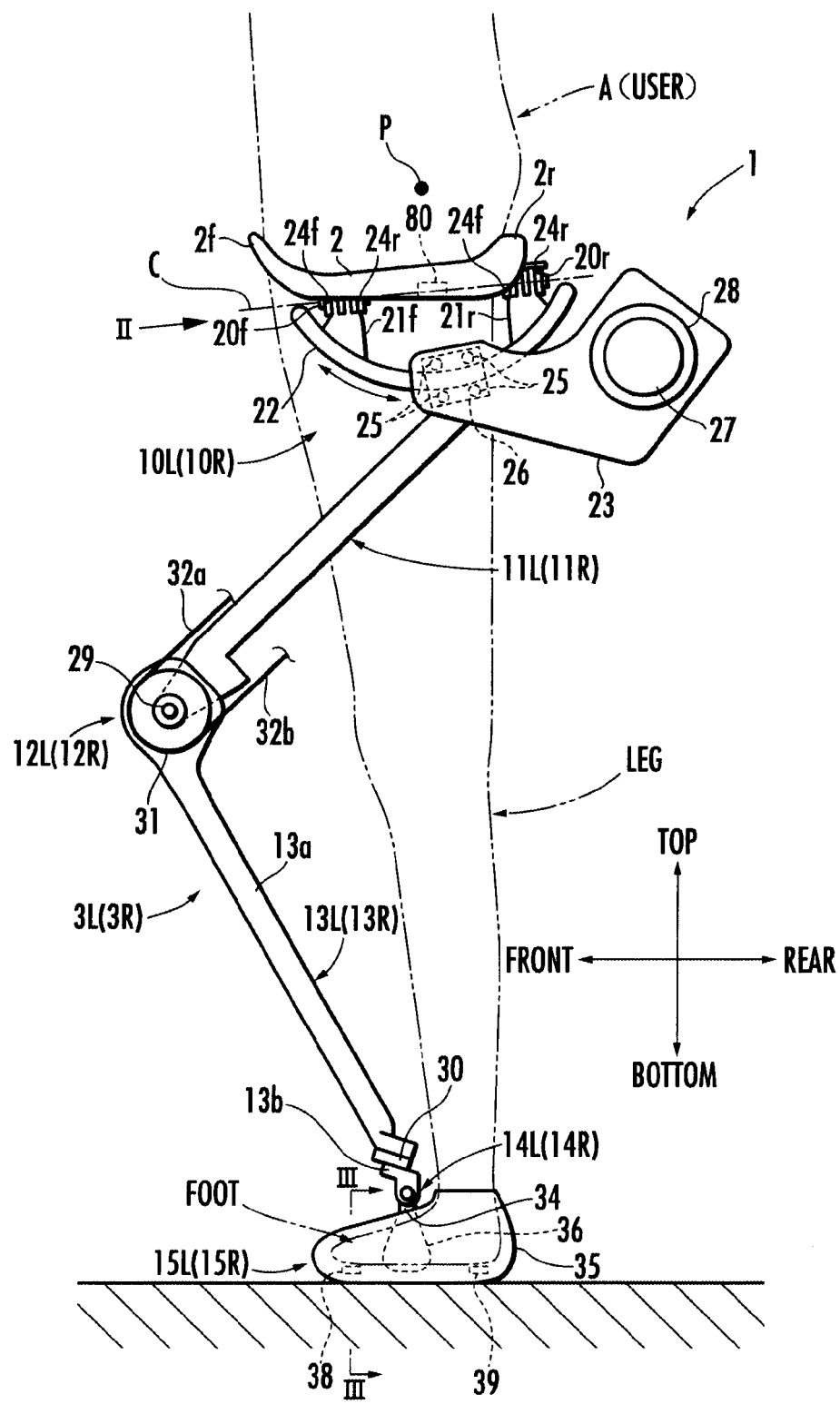
FIG. 1 is a side view of a walking assistance device 1 in a first embodiment of the present invention.
Figure 2:
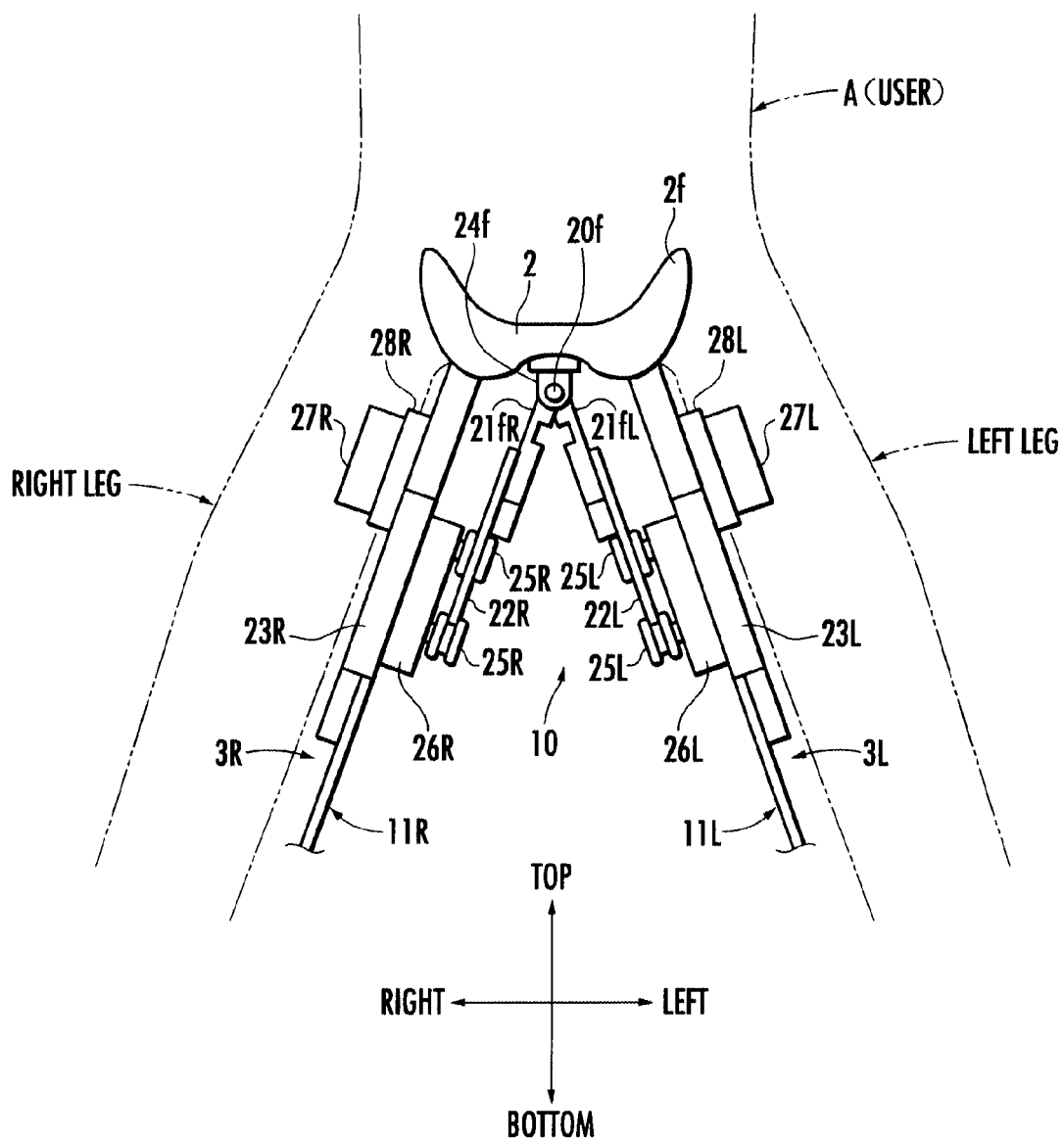
FIG. 2 is a fragmentary view taken on line II of FIG. 1.
Figure 3:
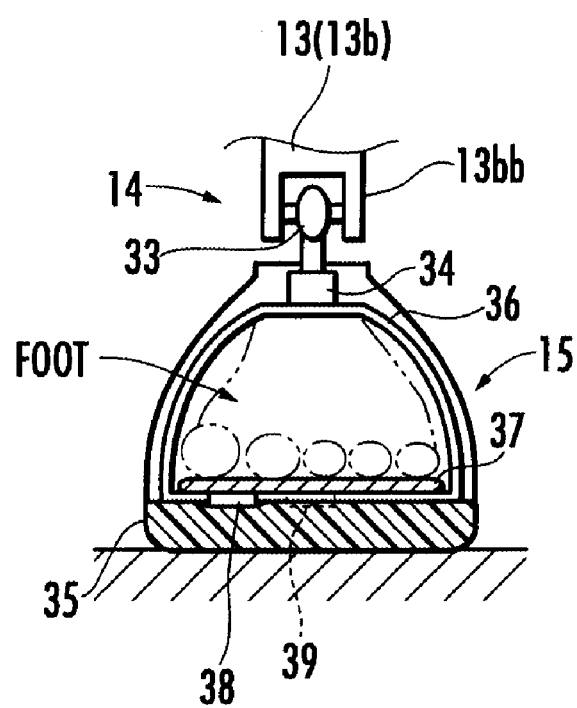
FIG. 3 is a sectional view taken at the line III-III of FIG. 1.
Figure 4:
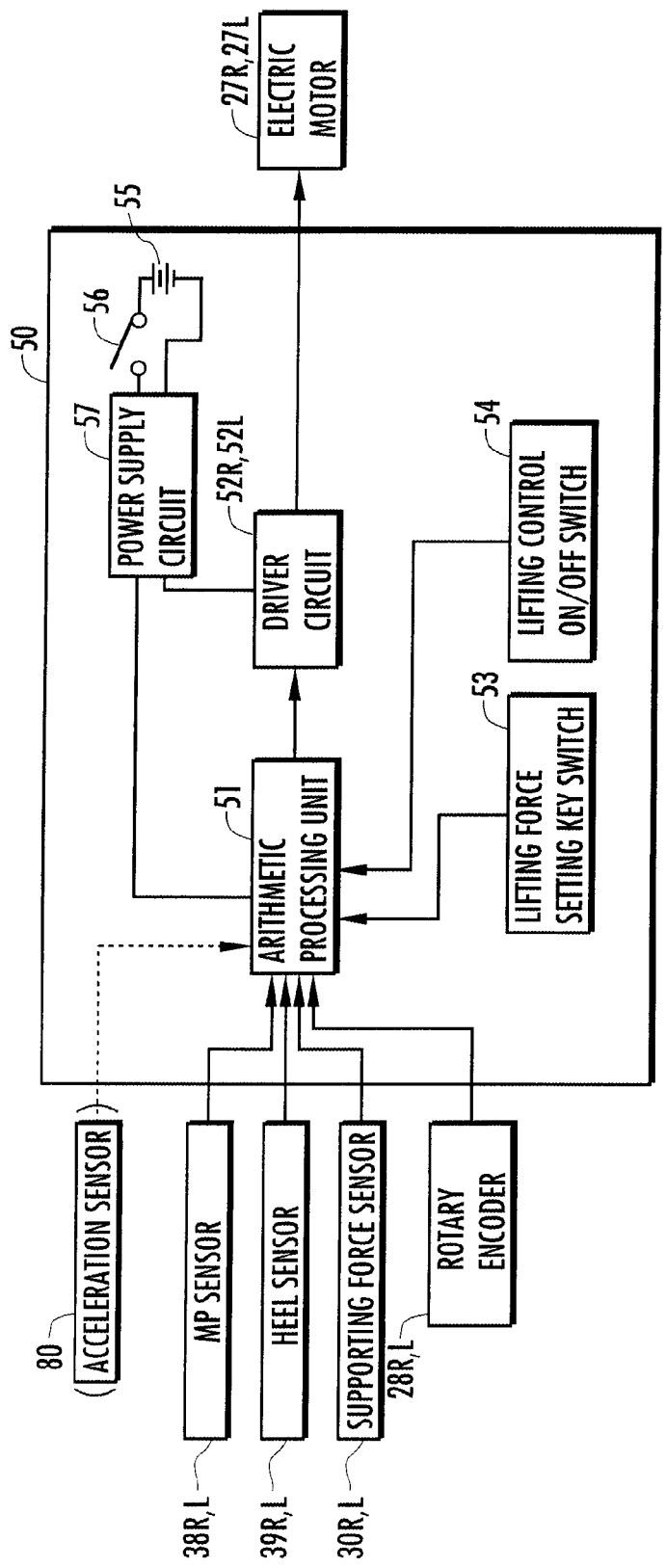
FIG. 4 is a block diagram schematically illustrating the construction (hardware construction) of a controller of a walking assistance device of FIG. 1.
Figure 5:
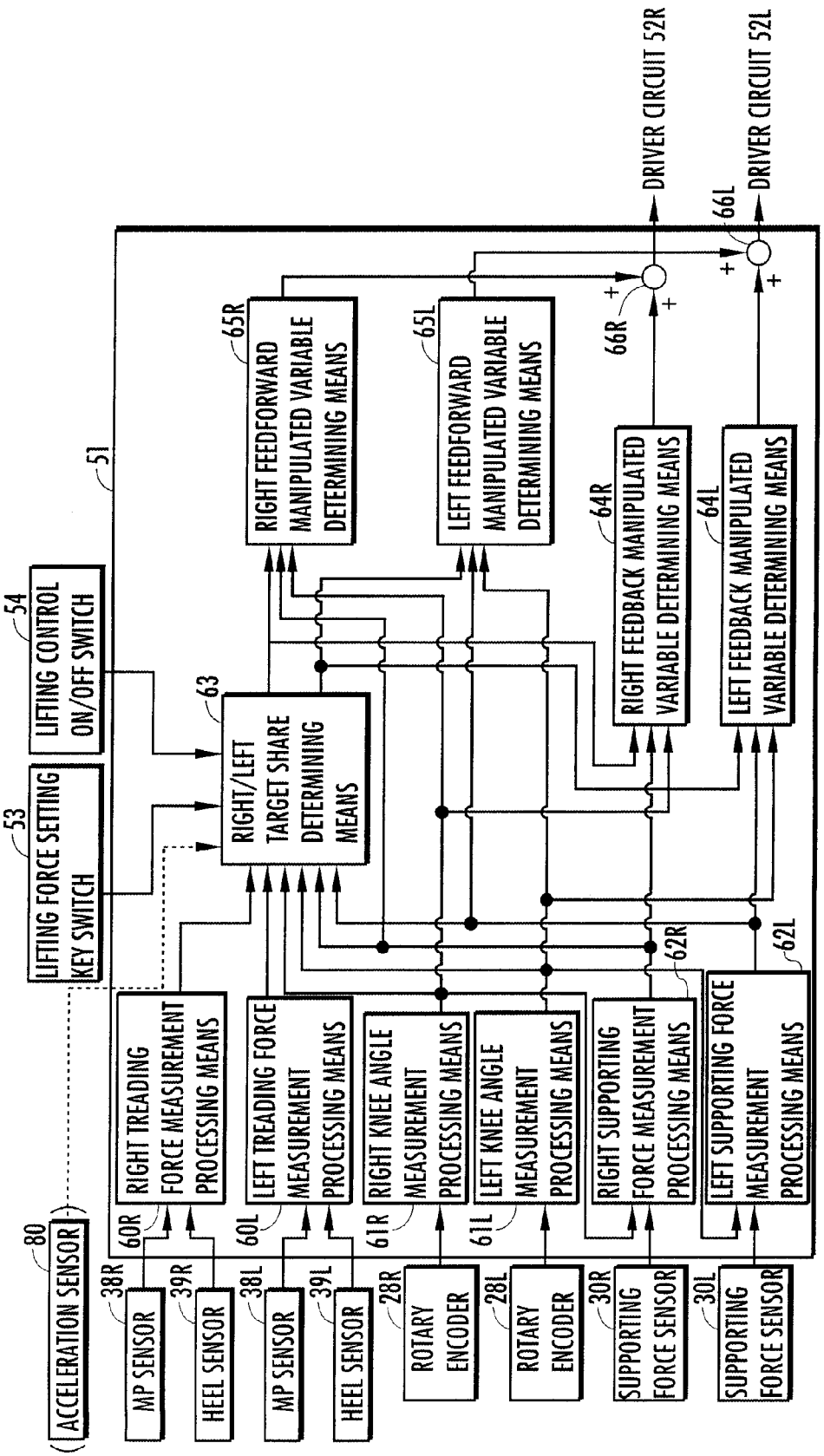
FIG. 5 is a block diagram illustrating functional means of an arithmetic processing unit 51 provided in the controller of FIG. 4.
Figure 6:
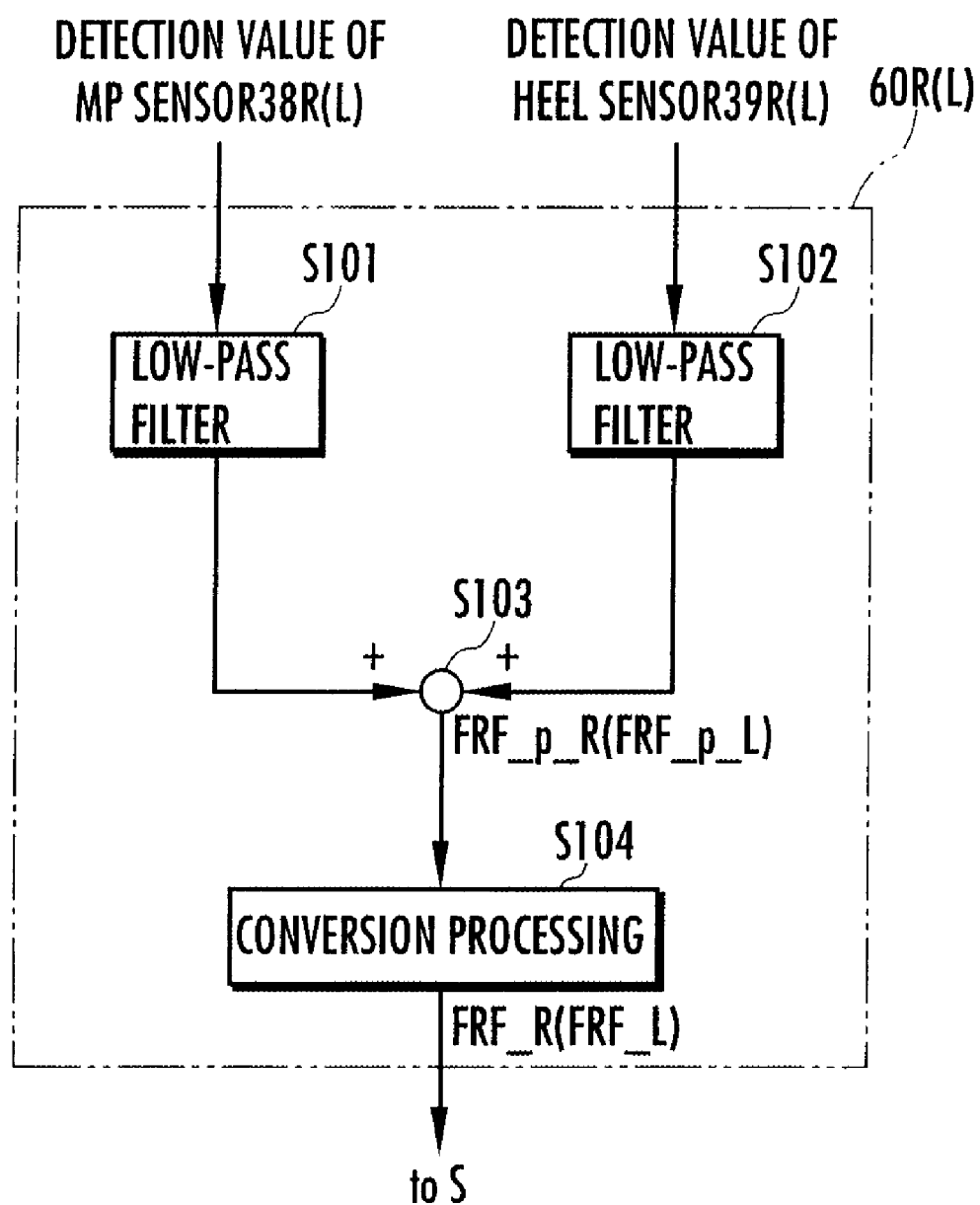
FIG. 6 is a block diagram illustrating the flow of the processing by treading force measurement processing means 60R and 60L.
Figure 7:
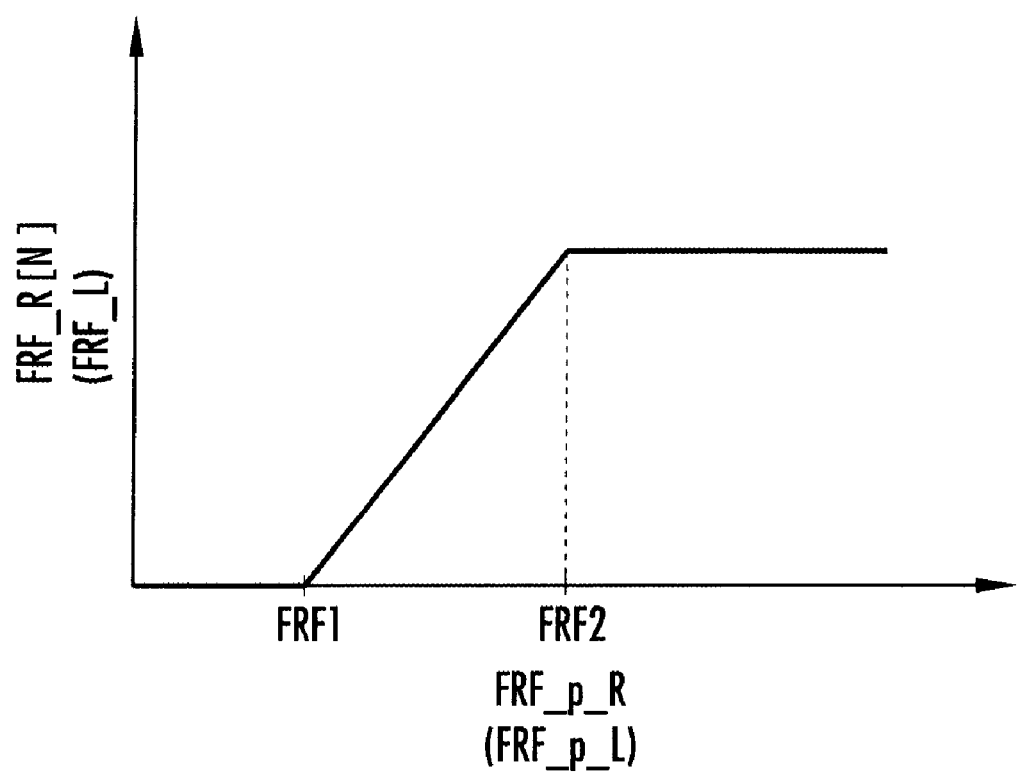
FIG. 7 is a graph illustrating a table used in the processing in S104 of FIG. 6.
Figure 8:
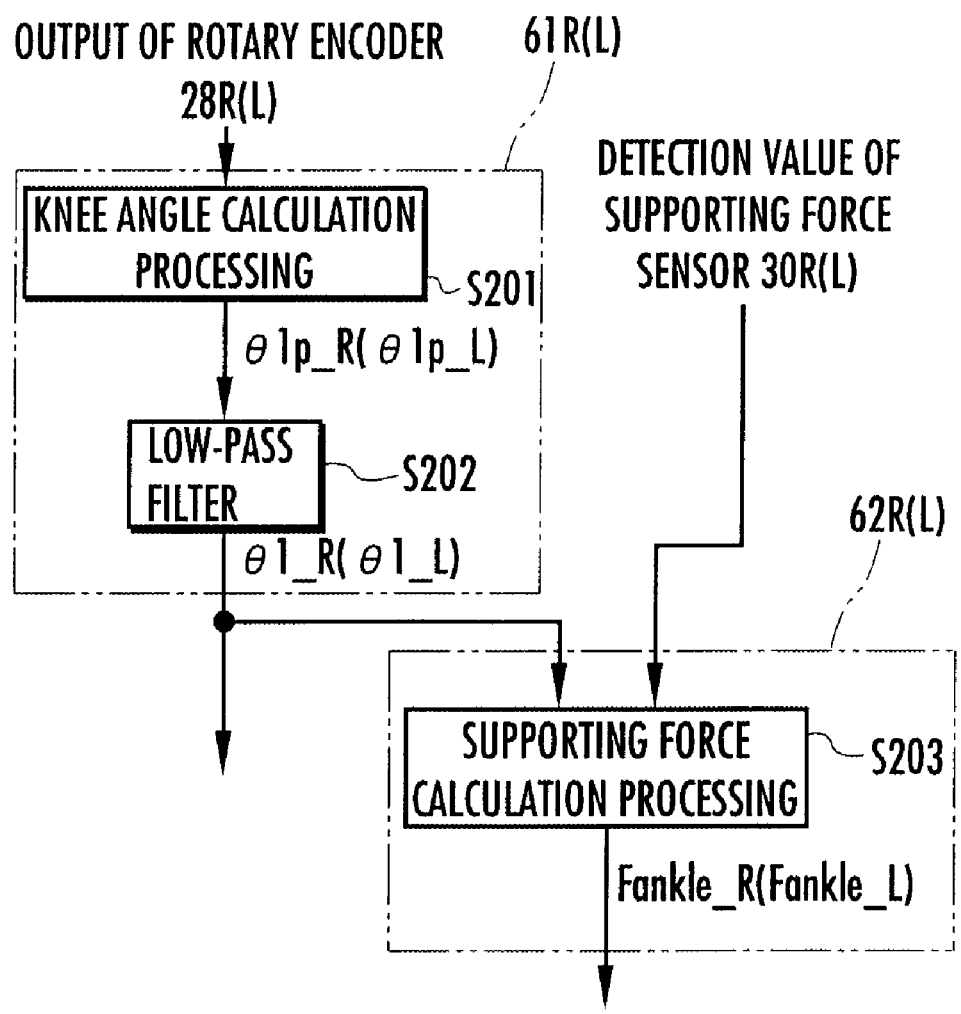
FIG. 8 is a block diagram illustrating the flow of the processing by knee angle measurement processing means 61R and 61L.
Figure 9:
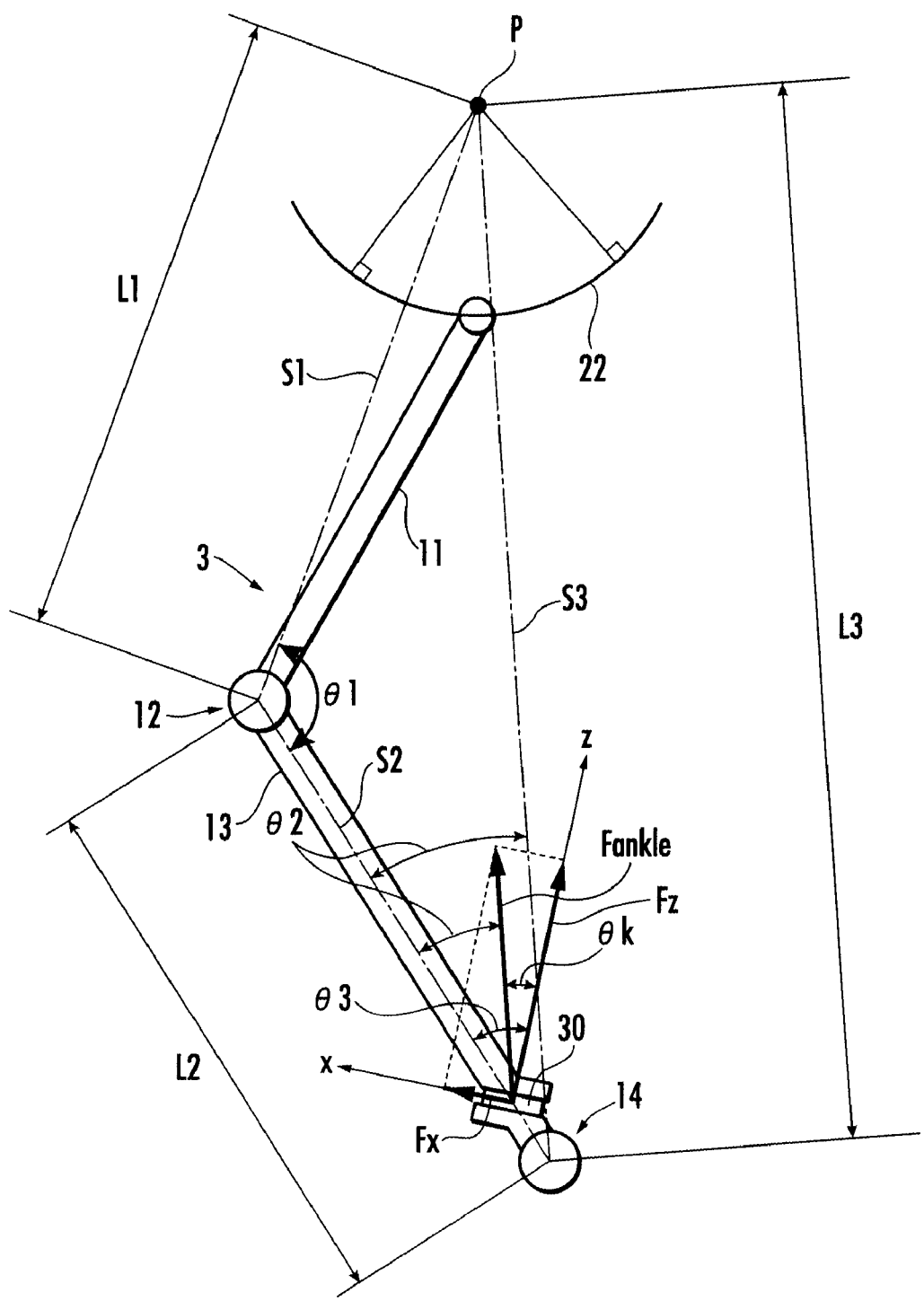
FIG. 9 is a diagram for explaining the processing in S201 and S203 of FIG. 8.
Figure 10:
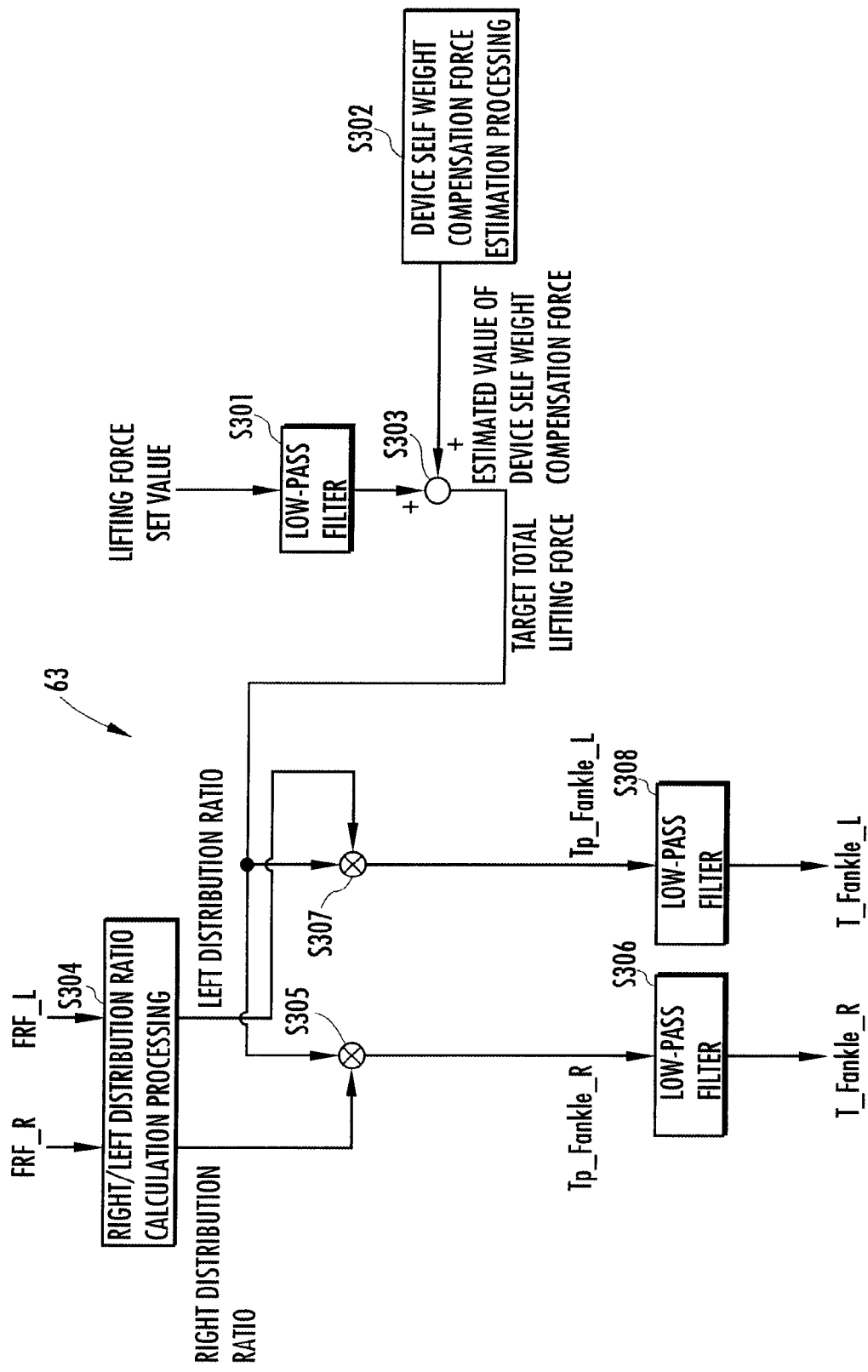
FIG. 10 is a block diagram illustrating the flow of the processing by right/left target share determining means 63.
Figure 11:
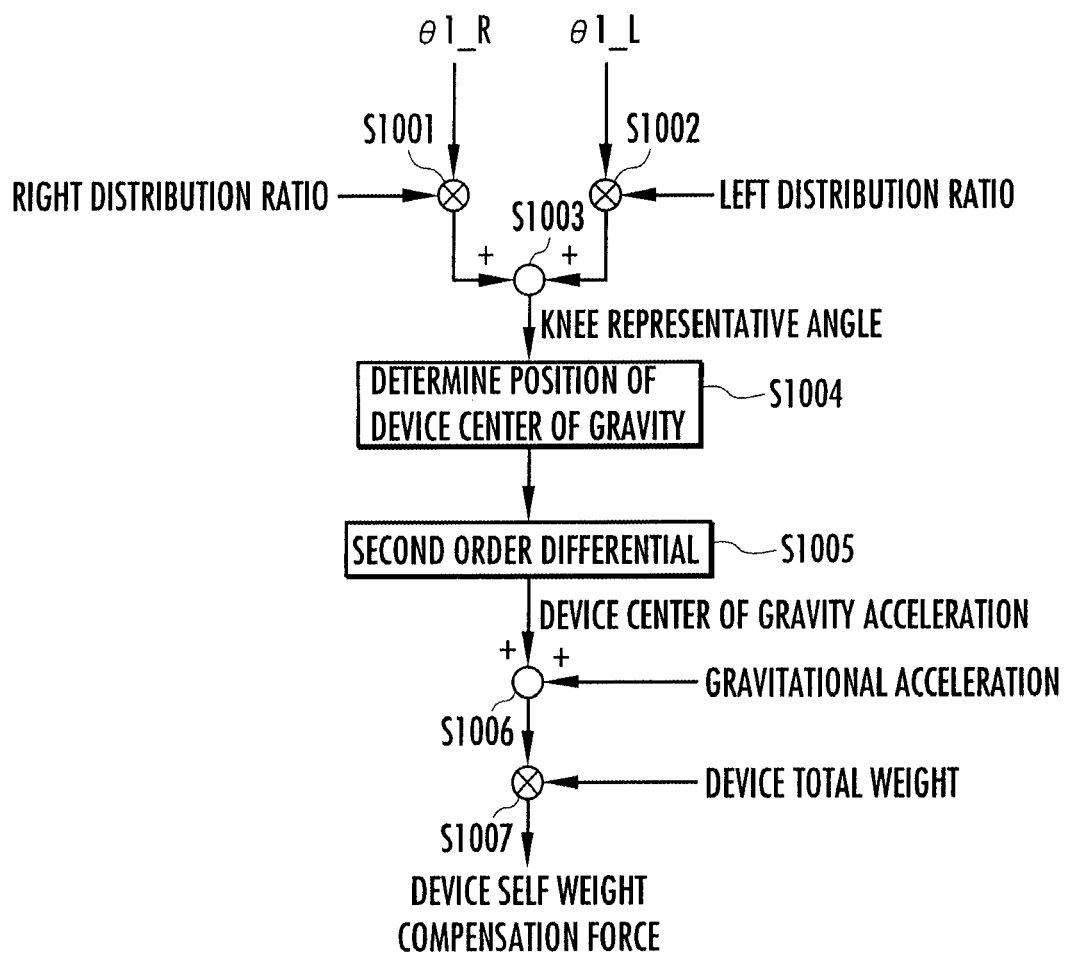
FIG. 11 is a block diagram illustrating the flow of the processing in S302 of FIG. 10.
Figure 12:
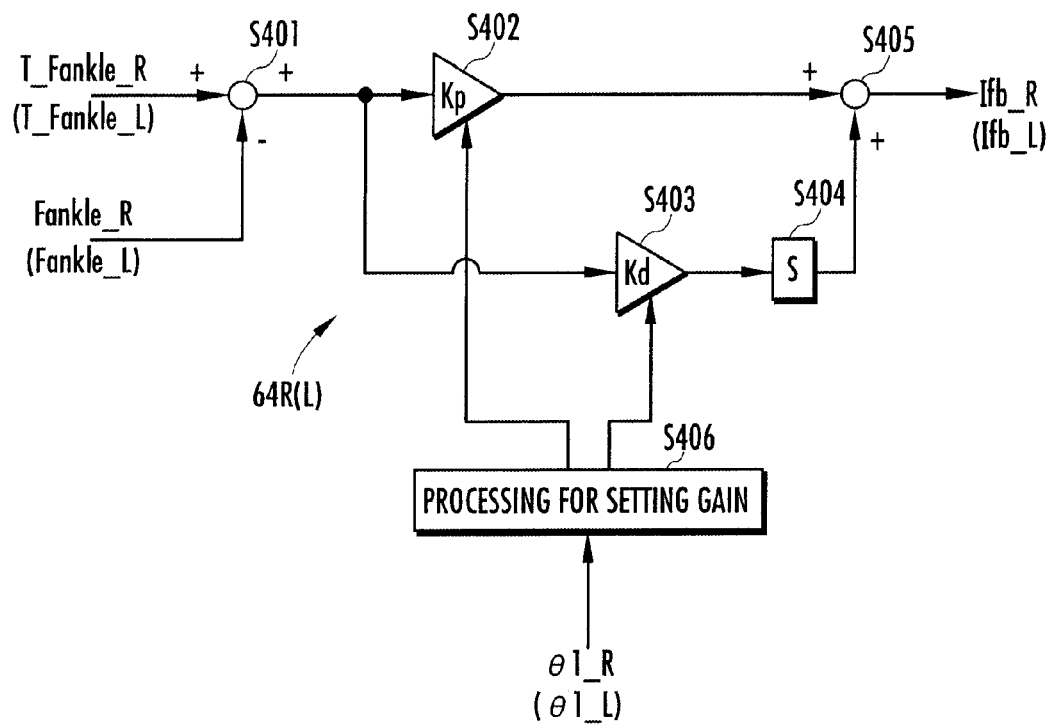
FIG. 12 is a block diagram illustrating the flow of the processing by feedback manipulated variable determining means 64R and 64L.
Figure 13:
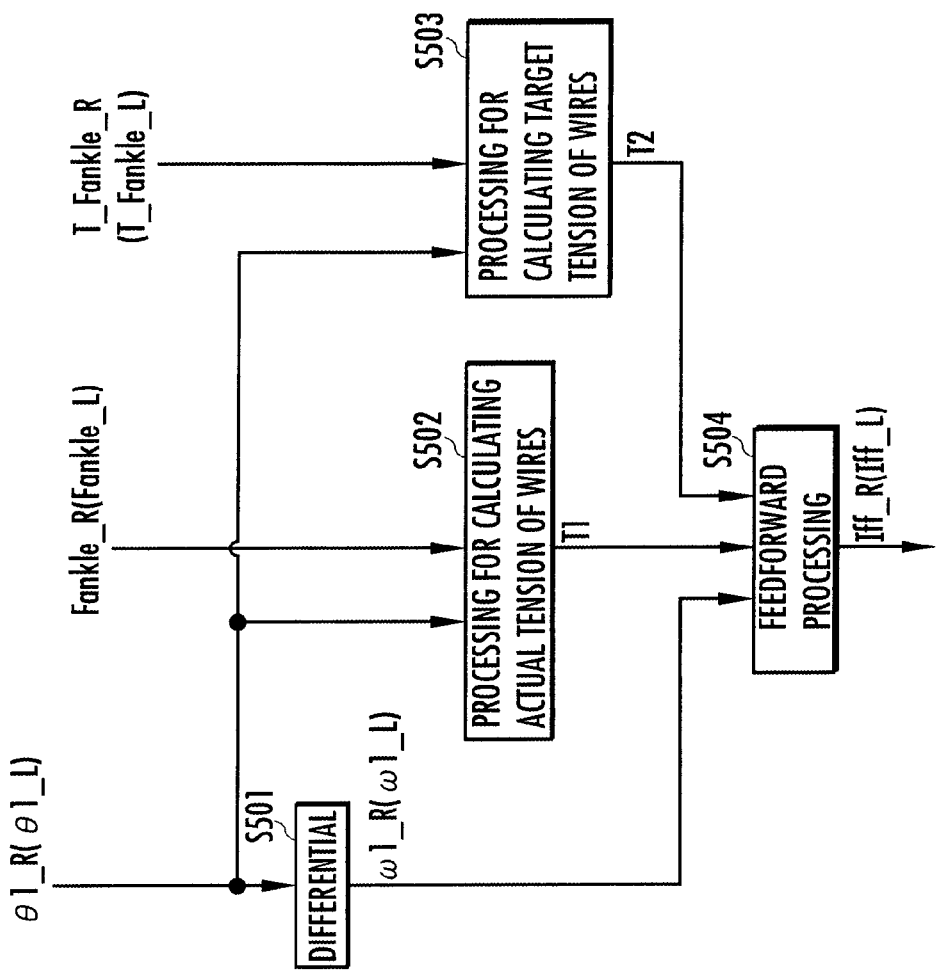
FIG. 13 is a block diagram illustrating the flow of the processing by the feedforward manipulated variable determining means 65R and 65L.
Figure 14:
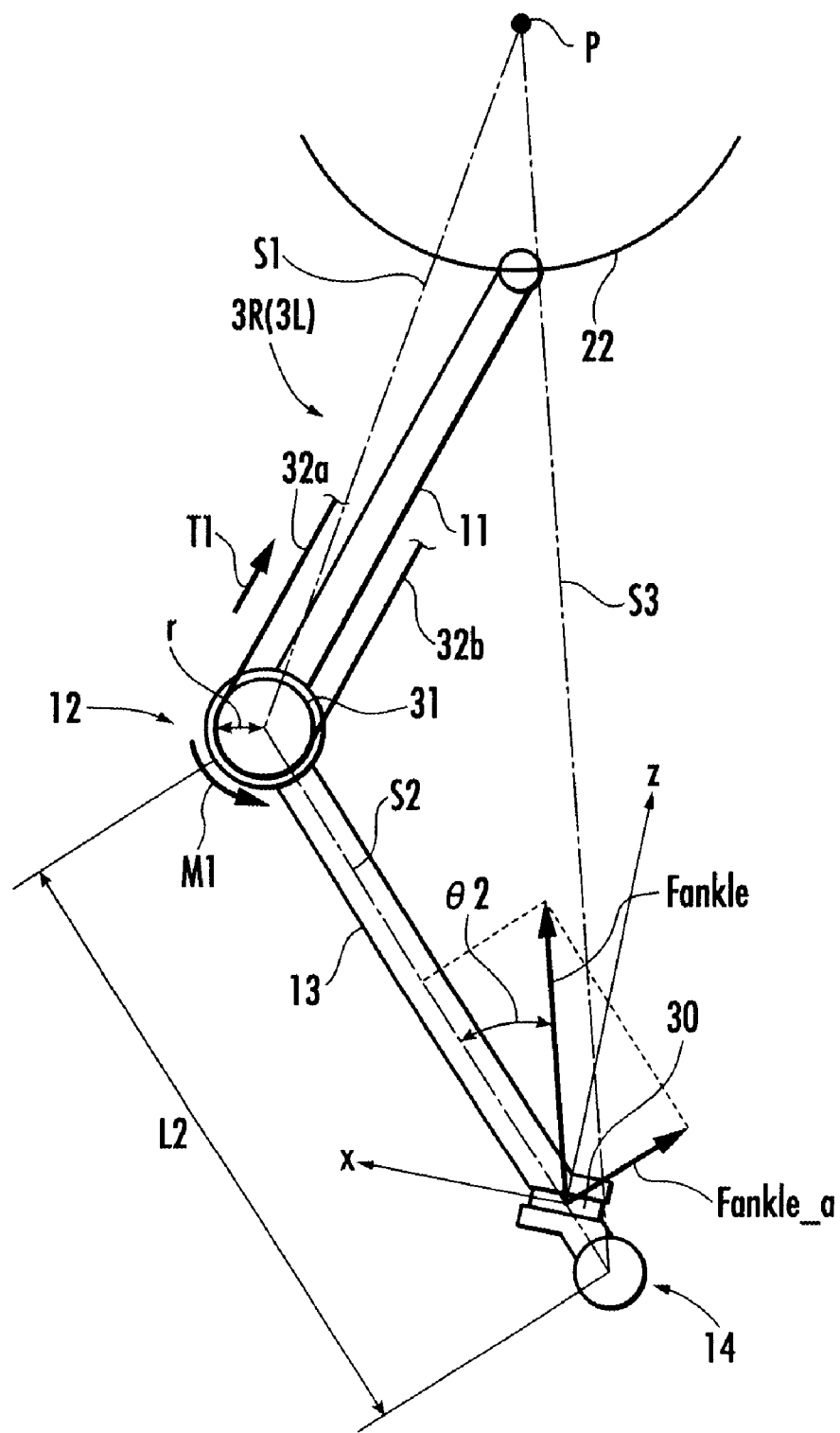
FIG. 14 is a diagram for explaining the processing in S502 of FIG. 13.
Figure 15:
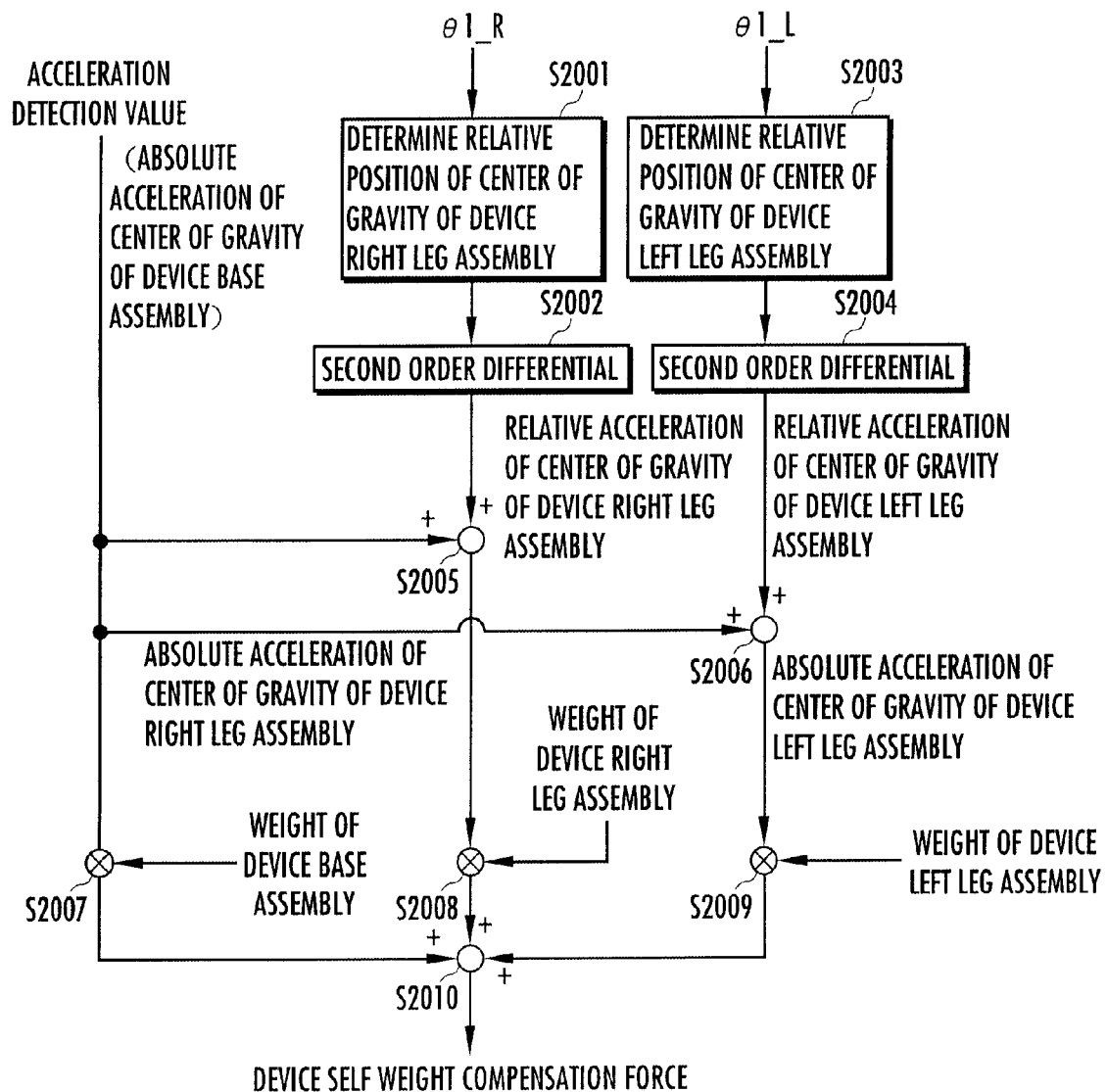
FIG. 15 is a block diagram illustrating the flow of the processing in S302 of FIG. 10 in a second embodiment of the present invention.

The invention claimed is:

1. A control device for a walking assistance device provided with a lifting force transmitting assembly brought in contact with a body trunk of a user to allow an upward lifting force to act on the body trunk, a pair of right and left foot-mounted assemblies which are attached to feet of legs of the user and which come in contact with a ground in a case where the legs of the user become standing legs, a pair of right and left leg links, each of which has a plurality of joints and which connects the lifting force transmitting assembly and each of the foot-mounted assemblies, and a right leg link actuator and a left leg link actuator which drive at least one joint of the leg links, the control device comprising:

a target lifting force setting element configured to set a target value of the lifting force;

a device self weight compensation force estimating element configured to estimate a total sum of supporting forces acting on leg links from a floor in reaction to a vertical inertial force actually generated in the walking assistance device due only to a motion of the walking assistance device and gravity acting on the walking assistance device as a device self weight compensation force;

a target total lifting force determining element configured to determine a total sum of the target value of the lifting force and the estimated device self weight compensation force as a target total lifting force of the walking assistance device; and an actuator controlling element configured to control driving forces of the right leg link actuator and the left leg link actuator such that the total sum of the supporting forces actually acting from the floor on the leg links of the walking assistance device becomes the target total lifting force.

2. The control device for a walking assistance device according to claim 1, comprising a treading force measuring element configured to measure a treading force of each leg of the user based on an output of a first force sensor provided in each of the foot-mounted assemblies, and a distribution element which distributes the target total lifting force based on a ratio between the treading force of the left leg of the user and the treading force of the right leg thereof, which have been measured, thereby determining a target share, which is a target value of a share of each leg link of the target total lifting force, wherein the actuator controlling element is further configured to control the driving force of the right leg link actuator such that a supporting force actually acting on the right leg link from the floor becomes the target share associated with the right leg link, and to control the driving force of the left leg link actuator such that a supporting force actually acting on the left leg link from the floor becomes the target share associated with the left leg link.

3. The control device for a walking assistance device according to claim 2, comprising:

a control target force measuring element configured to measure a supporting force actually acting on each of the leg links from the floor as a control target force based on an output of a second force sensor provided in the leg link, wherein the actuator controlling element is further configured to feedback-control the right leg link actuator such that the measured control target force of the right leg link approaches the target share associated with the right leg link, and to feedback-control the left leg link actuator such that the measured control target force of the left leg link approaches to the target share associated with the left leg link.

4. The control device for a walking assistance device according to claim 2, wherein each of the leg links comprises a thigh frame connected to the lifting force transmitting assembly through an intermediary of a first joint, a crus frame connected to the thigh frame through an intermediary of a second joint, and a third joint which connects the foot-mounted assembly to the crus frame, the control device comprises a joint displacement amount measuring element configured to measure the displacement amount of the second joint of each of the leg links, and the device self weight compensation force estimating element is further configured to sequentially estimate a vertical position of a center of gravity of the walking assistance device based on a representative value of a second joint displacement amount, which is a sum of the value obtained by multiplying a proportion of the treading force of the left leg relative to the total sum of the measured treading forces of the right and left legs of the user by the measured displacement amount of the second joint of the left leg link and a value obtained by multiplying the proportion of the treading force of the right leg relative to the total sum of the treading forces by the measured displacement amount of the second joint of the right leg link, and to estimate the device self weight compensation force from a time series of an estimated value of the vertical position and a weight and a gravitational acceleration of the walking assistance device.

5. The control device for a walking assistance device according to claim 2, wherein each of the leg links comprises a thigh frame connected to the lifting force transmitting assembly through an intermediary of a first joint, a crus frame connected to the thigh frame through an intermediary of a second joint, and a third joint which connects the foot-mounted assembly to the crus frame, the control device comprises a joint displacement amount measuring element configured to measure a displacement amount of the second joint of each of the leg links and an acceleration sensor which detects an acceleration of the lifting force transmitting assembly, and the device self weight compensation force estimating element is further configured to estimate: a first component attributable to a weight of a device base assembly of the device self weight compensation force based on an output of the acceleration sensor and a preset weight of the device base assembly composed of the lifting force transmitting assembly and a portion secured to the lifting force transmitting assembly of the walking assistance device; a relative vertical position of a center of gravity of a device right leg with respect to the device base assembly, the device right leg being a portion relatively movable integrally with the right leg link of the walking assistance device with respect to the device base assembly based on the measured displacement amount of the second joint of the right leg link; a second component attributable to a weight of a device right leg of the device self weight compensation force based on a time series of the estimated relative vertical position of the center of gravity of the device right leg, a preset weight of the device right leg, and an output of the acceleration sensor; a relative vertical position of a center of gravity of a device left leg relative to the device base assembly, the device left leg being a portion relatively movable integrally with the left leg link of the walking assistance device with respect to the device base assembly based on the measured displacement amount of the second joint of the left leg link; a third component attributable to a weight of the device left leg of the device self weight compensation force based on a time series of the estimated relative vertical position of the center of gravity of the device left leg, a preset weight of the device left leg, and an output of the acceleration sensor; and a total sum of the estimated first to third components as the device self weight compensation force.

* * * * *